US006775426B2

(12) United States Patent
Ito et al.

(10) Patent No.: US 6,775,426 B2
(45) Date of Patent: Aug. 10, 2004

(54) POLARIZATION MODE DISPERSION COMPENSATING DEVICE USING OPTICAL XOR CIRCUIT

(75) Inventors: Toshio Ito, Kanagawa-ken (JP); Rieko Sato, Kanagawa-ken (JP); Yasuhiro Suzuki, Kanagawa-ken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/207,357

(22) Filed: Jul. 29, 2002

(65) Prior Publication Data

US 2003/0021514 A1 Jan. 30, 2003

(30) Foreign Application Priority Data

| Jul. 27, 2001 | (JP) | 2001-227286 |
| Sep. 4, 2001 | (JP) | 2001-266858 |
| Apr. 3, 2002 | (JP) | 2002-100772 |
| Apr. 3, 2002 | (JP) | 2002-100773 |
| Apr. 4, 2002 | (JP) | 2002-102091 |

(51) Int. Cl.[7] .............................................. G02B 6/00
(52) U.S. Cl. ...................... 385/11; 385/14; 385/129; 385/130; 385/131
(58) Field of Search .................. 385/11, 14, 31, 385/122, 129, 130, 131, 132, 1, 2, 3

(56) References Cited

U.S. PATENT DOCUMENTS

| 4,382,660 A | * | 5/1983 | Pratt et al. ................... 359/244 |
| 4,926,177 A | * | 5/1990 | Sakata ......................... 341/137 |
| 4,962,987 A | * | 10/1990 | Doran ......................... 359/108 |
| 5,309,267 A | * | 5/1994 | Huang ......................... 398/155 |
| 5,369,520 A | * | 11/1994 | Avramopoulos et al. ..... 398/175 |
| 5,572,611 A | * | 11/1996 | Jinguji et al. ................. 385/17 |
| 6,538,807 B2 | * | 3/2003 | Kakui et al. ............. 359/341.5 |
| 2001/0046348 A1 | * | 11/2001 | Sarkimukka et al. ......... 385/24 |
| 2002/0060760 A1 | * | 5/2002 | Weiner ......................... 349/96 |
| 2003/0021514 A1 | * | 1/2003 | Ito et al. ....................... 385/11 |
| 2003/0021541 A1 | * | 1/2003 | Carpenter .................... 385/52 |

OTHER PUBLICATIONS

Communications, 1999. APCC/OECC '99. Fifth Asia–pacific on . . . and Fourth Optoelectronics and Communications Conference, pp. 424–427 vol. 1 40–Gbit/s Transmission over High–PMD Fiber with Automatic PMD Compensation.
Optical Communication, 2001, ECOC 01–27th European, pp. 10–11 Planar Lightwave Circuit Polarization Mode Dispersion Compensator.
Electronics Letters, Apr. 15, 1999, pp. 652–654. Integrated Optical LiNbO/sub 3/Distributed Polarization Mode Sispersion Compensator in 20 Gbit/s Transmission System.
Optical Fiber Communication Conference, 1999, and the International Conference on Integrated . . . Optical Fiber Communication. OFC.IOOC '99. Technical Digest, 1999, pp. 86–88.
Journal of Lightwave Technology, vol. 17, No. 9, Sep. 1999. Polarization Mode Dispersion Compensation at 10, 20, and 40 Gb/s with Various Optical Equalizers.

* cited by examiner

Primary Examiner—Brian M. Healy
(74) Attorney, Agent, or Firm—Kilpatrick Stockton LLP

(57) ABSTRACT

A polarization mode dispersion compensating device is formed by a polarization mode dispersion equalizer, a polarization component splitting unit for splitting a part of the polarization mode dispersion compensated optical signal into the TE polarization component and the TM polarization component, an optical XOR circuit for carrying out an optical XOR operation on the TE polarization component and the TM polarization component, and a control system for controlling the polarization mode dispersion equalizer such that the logical operation result outputted by the optical XOR circuit becomes "0".

26 Claims, 23 Drawing Sheets

POLARIZATION MODE DISPERSION EQUALIZER USING LN

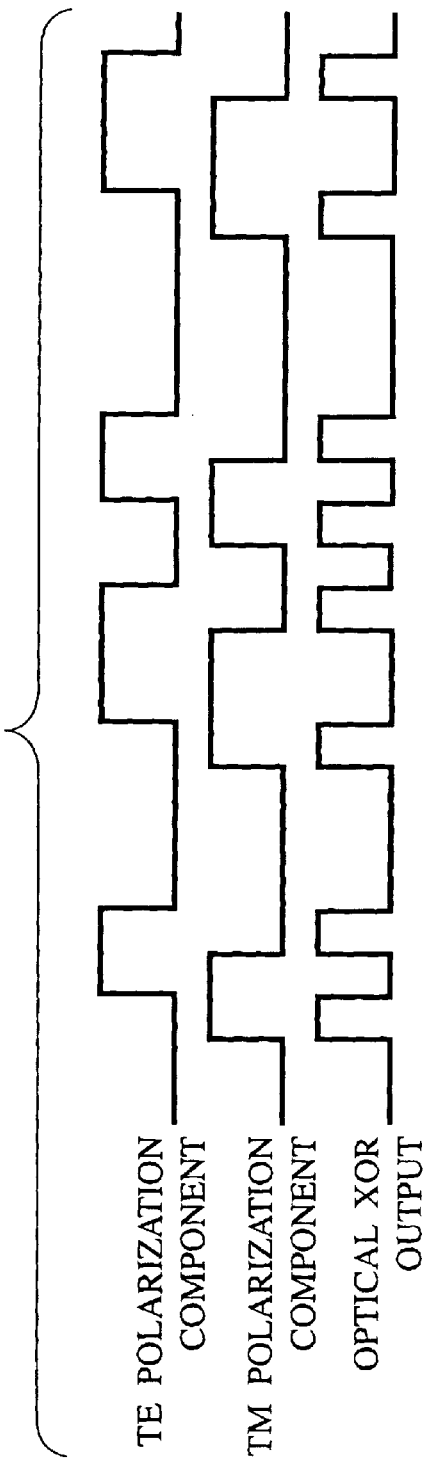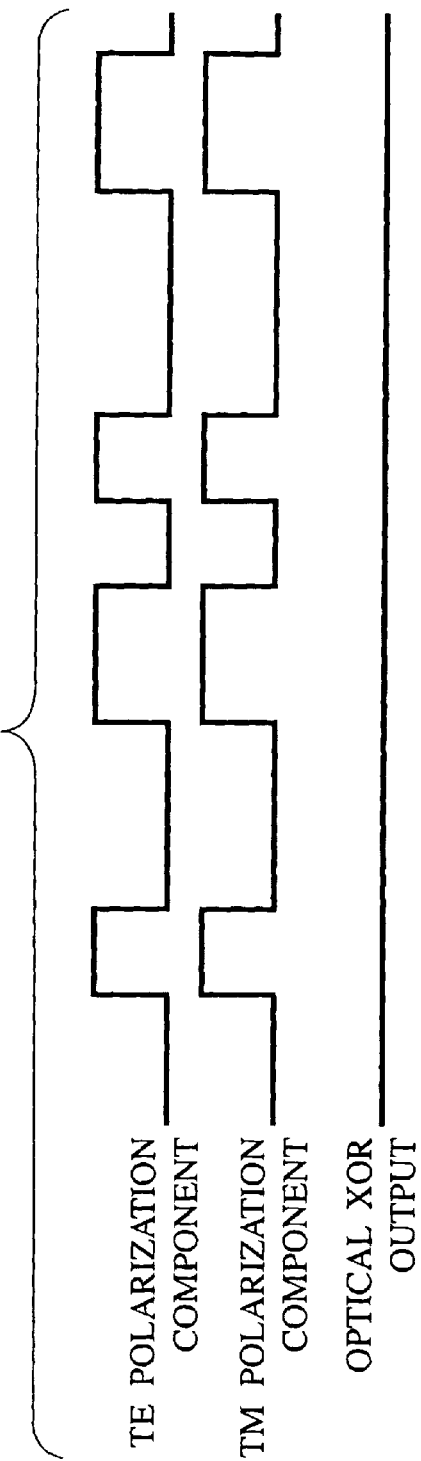

OPTICAL SIGNAL STATE OF OUTPUT LIGHT $S_O$

| SIGNAL LIGHT S2 \ SIGNAL LIGHT S1 | 0 | 1 |
|---|---|---|
| 0 | 0 | 1 |
| 1 | 1 | 0 |

POLARIZATION MODE DISPERSION COMPENSATING DEVICE USING OPTICAL XOR CIRCUIT

BACKGROUND OF THE INVENTION

1. Field of the Invention

The present invention relates to a polarization mode dispersion compensating device, which is a technology applied to an optical transmission system for high speed optical communications using optical fibers, optical switching, optical information processing, etc., and which is particularly useful in compensating the polarization mode dispersion.

The present invention also relates to a technique for effectively compensating the polarization mode dispersion even when a difference between the optical powers of the TE polarization component and the TM polarization component is large.

2. Description of the Related Art

In conjunction with the increase of the transmission capacity due to the advance of the IT field, the bit rate of the optical signals has a tendency of increasing from 2.5 Gb/s to 10 Gb/s, and further to 40 Gb/s. Here, the polarization mode dispersion poses a problem. FIG. 1 is for explaining the polarization mode dispersion, and showing an optical fiber 1001, an input optical pulse 1002, a TE or TM polarization component 1003 of the input optical pulse 1002, a TM or TE polarization component 1004 of the input optical pulse 1002, an output optical pulse 1007, a TE or TM polarization component 1005 of the output optical pulse 1007, and a TM or TE polarization component 1006 of the output optical pulse 1007.

In general, the optical fiber has the polarization mode dispersion due to its birefringence, so that the optical signals propagating through the optical fiber will be propagated by being divided into a fast propagation component and a slow propagation component depending on the polarization planes. In FIG. 1, the polarization component 1003 is the fast propagation component, which becomes the polarization component 1005 at the output end. On the other hand, the polarization component 1004 is the slow propagation component, which becomes the polarization component 1006 that arrives later than the polarization component 1005 at the output end. The output optical pulse 1007 is a sum of the polarization component 1005 and the polarization component 1006, so that the waveform of the output optical pulse 1007 will be distorted as a result.

The amount of the polarization mode dispersion is about $0.2 \times L^{1/2}$ (ps) to $2 \times L^{1/2}$ (ps) for a fiber length of L (Km), for example. Namely, assuming the optical fiber of 100 Km long, the polarization mode dispersion of 20 ps can occur at worst. This value is not a serious problem for 2.5 Gb/s (pulse width of 400 ps) or 10 Gb/s (pulse width of 100 ps), but it can cause a fatal waveform distortion for 40 Gb/s (pulse width 25 ps), which in turn can degrade the bit error rate largely.

In order to resolve this problem, conventionally, the polarization mode dispersion has been compensated by a configuration as shown in FIG. 2, which has an input optical fiber 1101, an input optical pulse 1102, a TE or TM polarization component 1103 of the input optical pulse 1102, a TM or TE polarization component 1104 of the input optical pulse 1102, a polarization controller 1105, an optical fiber 1106 with a particularly large polarization mode dispersion such as a polarization maintaining fiber, a TE or TM polarization component 1107, a TM or TE polarization component 1108, an optical coupler 1109, a photodetector 1110, an electric band-pass filter 1111, a control system 1112 of the polarization controller 1105, an output optical fiber 1113, a waveform reshaped optical pulse 1116, a TE or TM polarization component 1114 of the optical pulse 1116, and a TM or TE polarization component 1115 of the optical pulse 1116 (see, George Ishikawa, Hiroki Ooi, and Yuichi Akiyama, APCC/OECC '99, pp. 424–428).

The configuration of FIG. 2 uses a scheme for compensating the polarization mode dispersion by adjusting the polarization state of the input optical pulse 1102 by the polarization controller 1105 such that the delayed polarization component 1103 will be entered into a fast propagation direction of the optical fiber 1106 while the advancing polarization component 1104 will be entered into a slow propagation direction of the optical fiber 1106. As the optical fiber 1106, one with a particularly large polarization mode dispersion such as the polarization maintaining fiber is used. The polarization maintaining fiber has the polarization dispersion of about 1 ps per 1 m, for example.

According to the configuration of FIG. 2 disclosed in the above mentioned reference, a part of the optical signal is split at the optical coupler 1109 and detected at the photodetector 1110, and an electric signal obtained by the photoelectric conversion of the detected light at the photodetector 1110 is sent to the control system 1112 through the electric band-pass filter 1111 with a bandwidth equal to one half of the transmission speed. The control system 1112 controls the polarization controller 1105 to maximize the intensity of the electric signal (i.e., the intensity of the detected light), so as to minimize the polarization mode dispersion, i.e., to minimize a difference between the differential group delays of the polarization component 1114 and the polarization component 1115, such that the waveform reshaped optical pulse 1116 can be obtained.

However, the conventional art shown in FIG. 2 has the following drawbacks. The first drawback is a limitation on the bit rate of the optical signals. The configuration of FIG. 2 requires the electric band-pass filter 1111 with a bandwidth equal to exactly one half of the bit rate, so that the bit rate cannot be changed. The second drawback is that, when "10" codes appear consecutively as in "10101010 . . . ", for example, the higher harmonic component at one half of the bit rate increases so that there is a problem of affecting the electric feedback. The third drawback is that it requires the photodetector 1110 with a speed equal to one half of the bit rate so that there is a problem of making the photodetector 1110 expensive.

BRIEF SUMMARY OF THE INVENTION

It is therefore an object of the present invention to provide a polarization mode dispersion compensating device which is capable of changing the bit rate, which does not affect the feedback system even when "10" codes appear consecutively, and which can be formed by using a low speed photodetector.

It is another object of the present invention to provide a polarization mode dispersion compensating device which is capable of effectively compensating the polarization mode dispersion even when a difference between the optical powers of the TE polarization component and the TM polarization component is large.

According to one aspect of the present invention there is provided a polarization mode dispersion compensating device, comprising: a polarization mode dispersion equalizer configured to receive an input optical signal propagated through an optical fiber, and output a polarization mode dispersion compensated optical signal by compensating a polarization mode dispersion of the input optical signal such that a difference between transmission delays of a TE polarization component and a TM polarization component of the input optical signal becomes minimum; a polarization component splitting unit configured to receive the polarization mode dispersion compensated optical signal outputted from the polarization mode dispersion equalizer, and split a part of the polarization mode dispersion compensated optical signal into the TE polarization component and the TM polarization component; an optical XOR circuit configured to receive the TE polarization component and the TM polarization component split by the polarization component splitting unit separately at two input ports through an identical optical path length, and output a logical operation result of an optical XOR operation on the TE polarization component and the TM polarization component entered at the two input ports; and a control system configured to control compensation by the polarization mode dispersion equalizer such that the logical operation result outputted by the optical XOR circuit becomes "0".

According to another aspect of the present invention there is provided a polarization mode dispersion compensating method, comprising the steps of: compensating a polarization mode dispersion of an input optical signal propagated through an optical fiber, by controlling a polarization state of the input optical signal by a polarization controller and compensating a polarization mode dispersion of a polarization state controlled optical signal by having the polarization state controlled optical signal propagated through a polarization mode dispersion controlling optical fiber, such that a difference between transmission delays of a TE polarization component and a TM polarization component of the input optical signal becomes minimum; splitting a part of the polarization mode dispersion compensated optical signal into the TE polarization component and the TM polarization component; adjusting optical powers of the TE polarization component and the TM polarization component to be equal, when a polarization state of the input optical signal is not in a special state in which a difference between the optical powers of the TE polarization component and the TM polarization component is less than or equal to a prescribed value; carrying out an optical XOR operation on the TE polarization component and the TM polarization component after the adjusting step; and controlling a control of the polarization state by the polarization controller such that a logical operation result of the optical XOR operation becomes "0".

Other features and advantages of the present invention will become apparent from the following description taken in conjunction with the accompanying drawings.

BRIEF DESCRIPTION OF THE DRAWINGS

FIGS. 16A and 16B are diagrams for explaining an optical XOR operation used in the polarization mode dispersion compensating device of the present invention.

DETAILED DESCRIPTION OF THE INVENTION

In the following, various embodiments of the present invention will be described with references to the drawings.

First Embodiment

Figure 1:
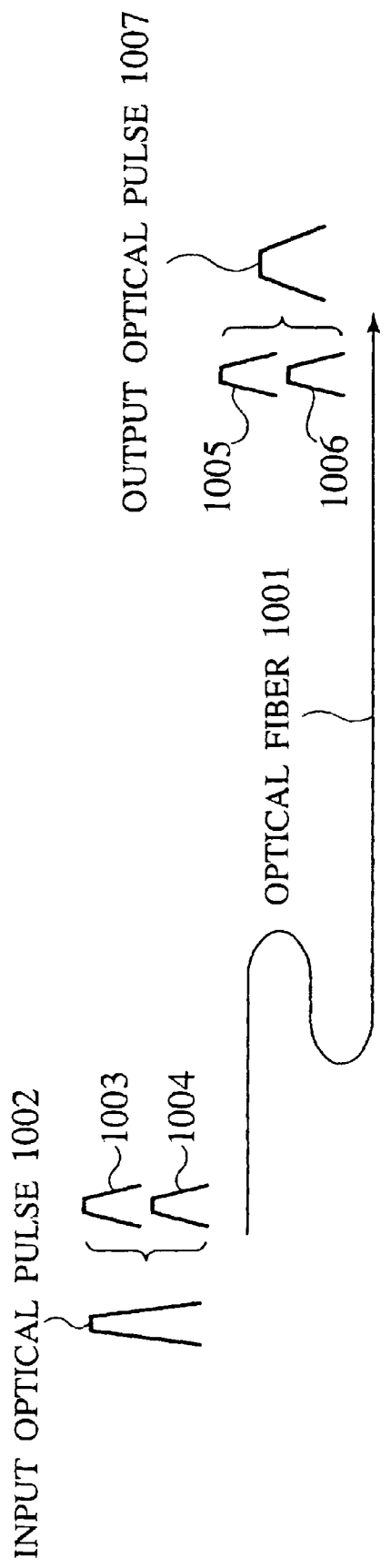
FIG. 1 is a diagram for explaining a polarization mode dispersion.
Figure 2:
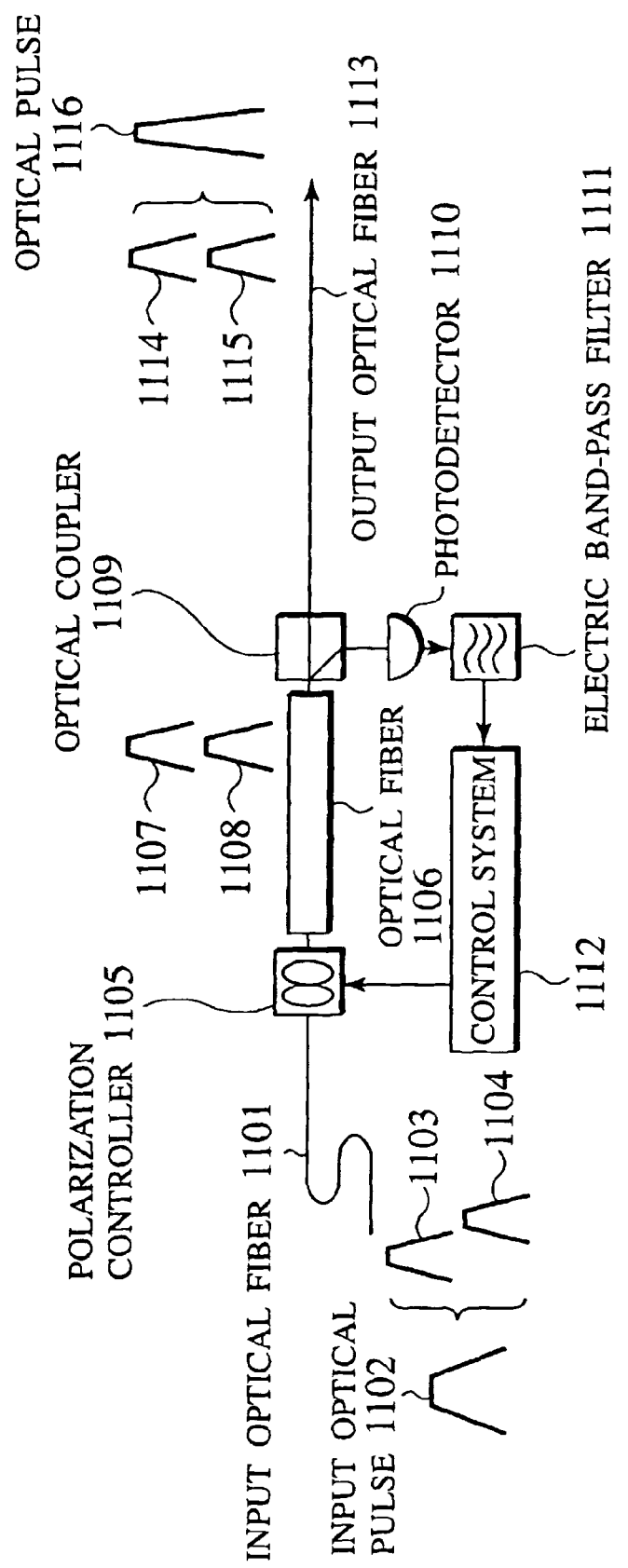
FIG. 2 is a schematic diagram showing a configuration of a conventional polarization mode dispersion compensating device.
Figure 3:
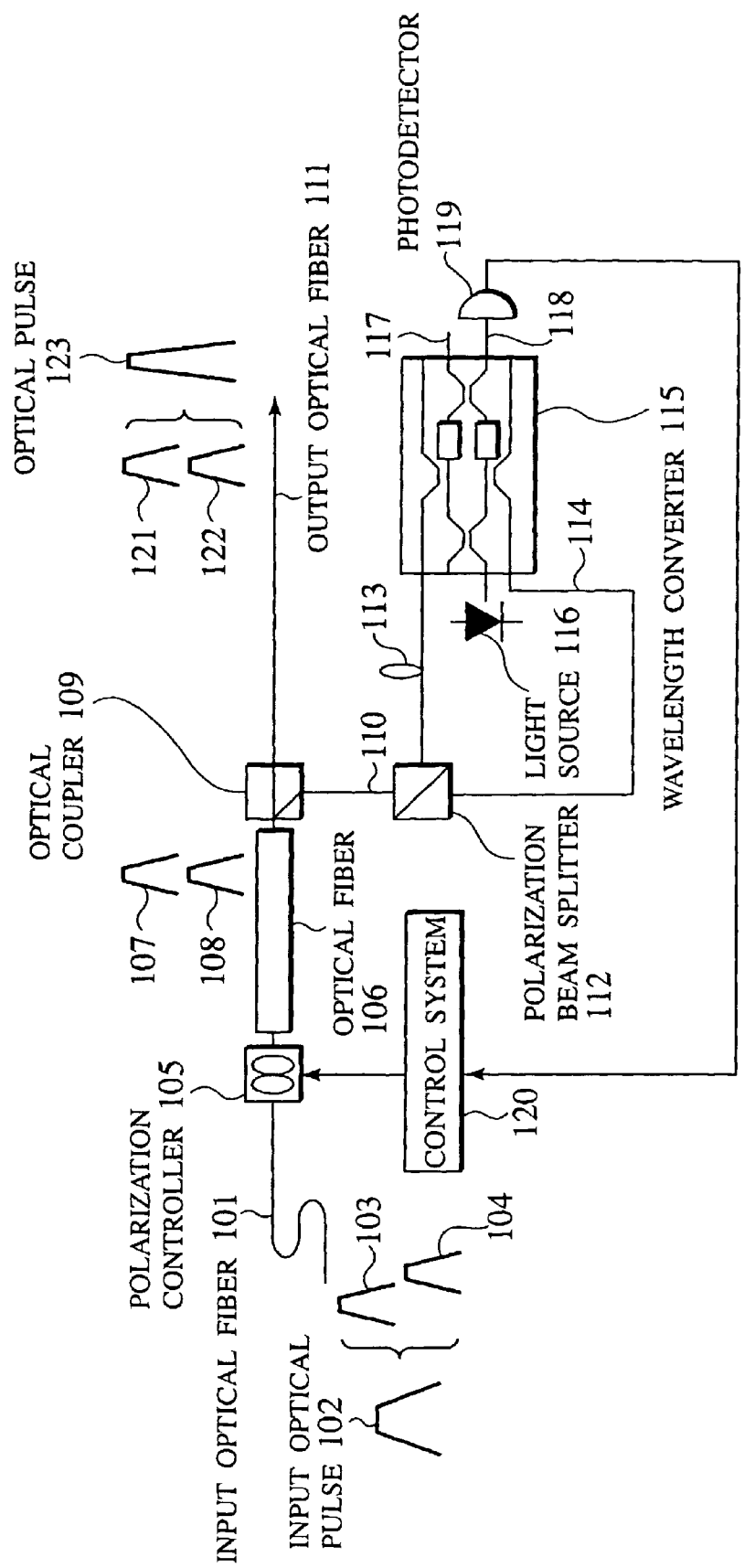
FIG. 3 is a schematic diagram showing an exemplary configuration of a polarization mode dispersion compensating device according to the first embodiment of the present invention.

FIG. 3 shows a polarization mode dispersion compensating device according to the first embodiment of the present invention, which has an input optical fiber 101, an input optical pulse 102, a TE or TM polarization component 103 of the input optical pulse 102, a TM or TE polarization component 104 of the input optical pulse 102, a polarization controller 105, an optical fiber 106 with a particularly large polarization mode dispersion such as the polarization maintaining fiber, a TE or TM polarization component 107, a TM or TE polarization component 108, an optical coupler 109, an optical waveguide 110, an output optical fiber 111, a polarization beam splitter 112, optical waveguides 113 and 114, a cross phase modulation type wavelength converter 115, a light source 116 of the wavelength converter 115, optical waveguides 117 and 118, a photodetector 119, a control system 120 of the polarization controller 105, a waveform reshaped optical pulse 123, a TE or TM polarization component 121 of the optical pulse 123, and a TM or TE polarization component 122 of the optical pulse 123.

The first embodiment shown in FIG. 3 uses a scheme for compensating the polarization mode dispersion by adjusting the polarization state of the input optical pulse 102 by the polarization controller 105 such that the delayed polarization component 103 will be entered into a fast propagation direction of the optical fiber 106 while the advancing polarization component 104 will be entered into a slow propagation direction of the optical fiber 106.

In this embodiment, a polarization mode dispersion equalizer is formed by the polarization controller 105 and the optical fiber (polarization maintaining fiber) 106 with a particularly large polarization mode dispersion.

Here, a part of the optical signal is split by the optical coupler 109, and its polarization components are further split by the polarization beam splitter 112. As a result, the TE or TM polarization component is outputted to the optical waveguide 113 while the TM or TE polarization component is outputted to the optical waveguide 114. Then, they are separately entered into two signal input ports of the wavelength converter 115, through the optical waveguide 113 and the optical waveguide 114 which are set to have the same optical length.

The wavelength converter 115 is a cross phase modulation type wavelength converter, which outputs a continuous light from the light source 116 to the output side optical waveguide 117 when both of the input side optical waveguides 113 and 114 have the optical signal level of "0" level. Namely, in this case, the optical signal level of the output side optical waveguide 118 is "0" level.

On the other hand, when the optical signal level of either one of the input side optical waveguides 113 and 114 becomes "1" level, the optical signal level of the output side optical waveguide 118 becomes "1" level according to the operation principle of the waveguide converter 115.

When both of the input side optical waveguides 113 and 114 have the optical signal level of "1" level, they cancel each other and the optical signal level of the output side optical waveguide 118 becomes "0" level.

This implies the so called XOR (exclusive OR) operation in which the optical signal level of the optical waveguide 118 becomes "0" level when the optical signal levels of the optical waveguide 113 and the optical waveguide 114 are equal, and the optical signal level of the optical waveguide 118 becomes "1" level when the optical signal levels of the optical waveguide 113 and the optical waveguide 114 are not equal. Note that, in this embodiment, the operation speed of the wavelength converter 115 which operates as an optical XOR circuit is slower than the transmission speed of the input optical signals so that the judgement of "0" or "1" is made by using average values of the optical signals. Of course it is also possible to use the wavelength converter with the faster operation speed.

Consequently, setting the optical signal level of the optical waveguide 118 always at "0" level implies that the optical signals propagating through the optical waveguide 113 and the optical waveguide 114 are exactly the same so that there is no differential phase delay between the polarization component 121 and the polarization component 122 propagating through the output optical fiber 111.

The photodetector 119 outputs an electric signal according to the detected optical power, so that the control system 120 adjusts the polarization controller 105 to control the polarization state of the input optical pulse 102 such that the intensity of the electric signal outputted from the photodetector 119 is minimized (i.e., the detected optical power is minimized), so as to minimize the polarization mode dispersion, i.e., to minimize a difference between the differential group delays of the polarization component 121 and the polarization component 122. By such a control operation, it is possible to obtain the waveform reshaped optical pulse 123.

Figure 4:
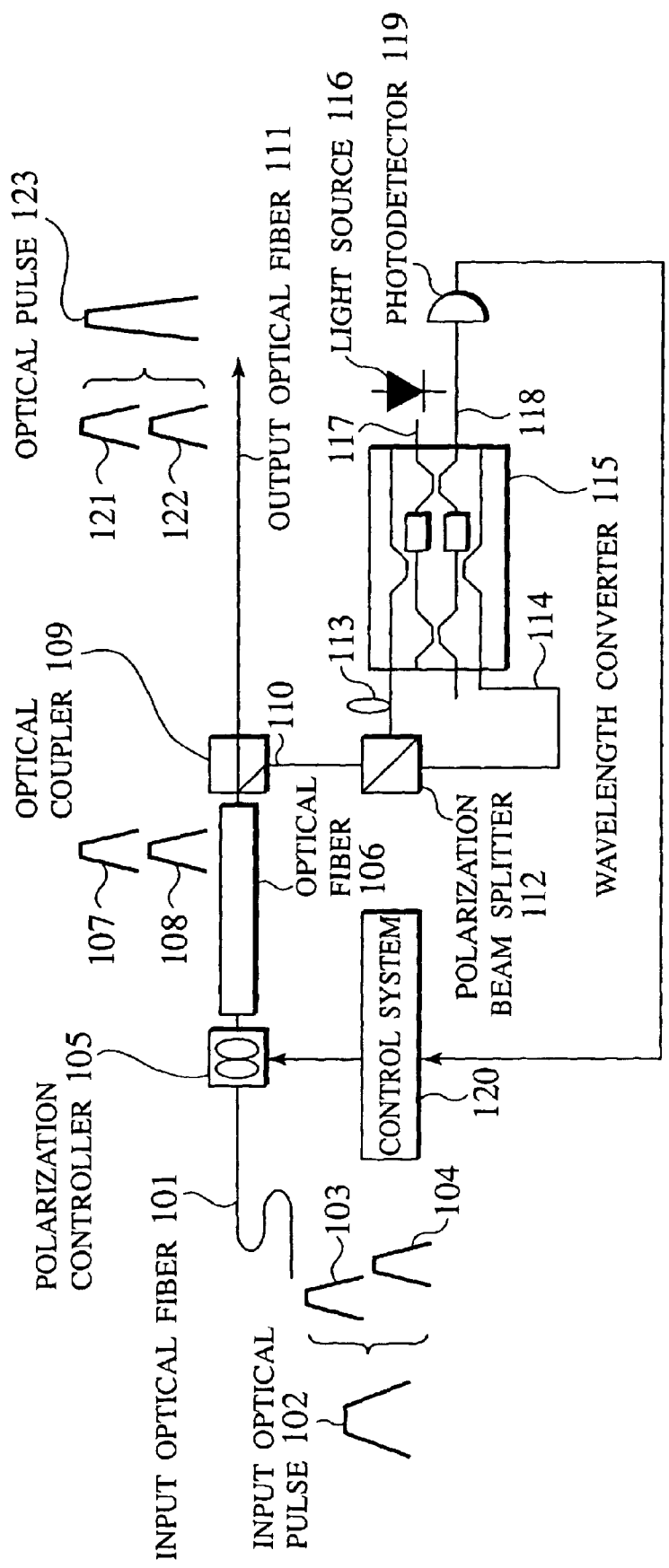
FIG. 4 is a schematic diagram showing a modified configuration of a polarization mode dispersion compensating device according to the first embodiment of the present invention.

Note that the operation similar to that of FIG. 3 can also be realized by a configuration shown in FIG. 4, in which the light source 116 is connected to the optical waveguide 117 such that the optical pulses (TE polarization component and TM polarization component) and the lights from the light source 116 have opposite propagation directions in the wavelength converter 115.

Note that the embodiment shown in FIG. 3 and FIG. 4 has a possibility of falling into the following undesirable state. Namely, at a time of controlling the polarization controller 105, besides the desirable state A in which the polarization component 103 and 104 are separated into the optical waveguides 113 and 114 respectively, there is a possibility of the undesirable state B in which a half of the optical output power of the polarization component 103 and a half of the optical output power of the polarization component 104 are outputted to the optical waveguide 113 while a remaining half of the optical output powers of the polarization components 103 and 104 are outputted to the optical waveguide 114, and then the polarization directions of the polarization components 103 and 104 are set to a direction in which the polarization mode dispersion of the optical fiber 106 becomes zero (at exactly 45° angle in a middle of a fastest propagation direction and a slowest propagation direction). This drawback can be resolved by the second embodiment to be described next.

Second Embodiment

Figure 5:
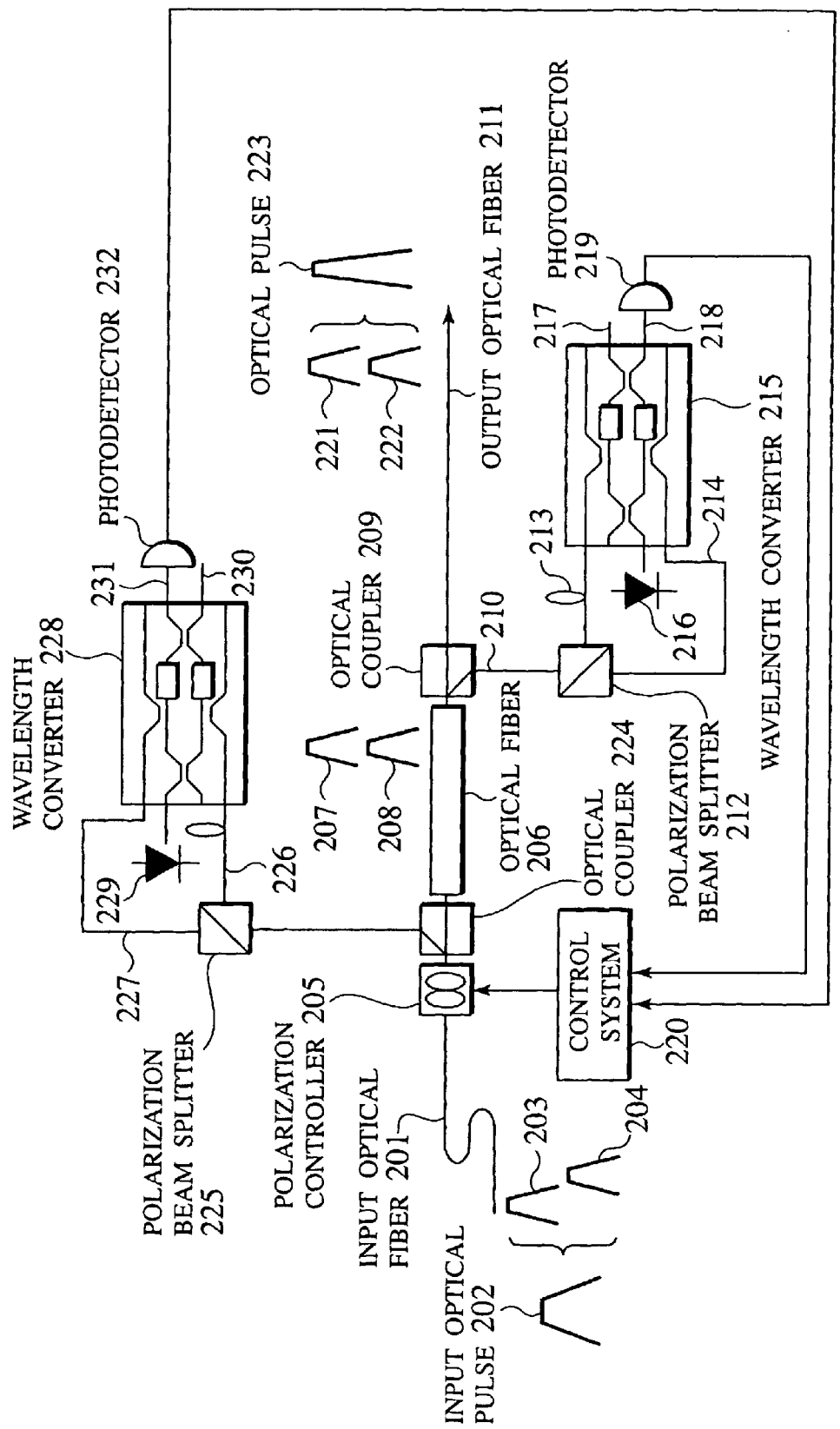
FIG. 5 is a schematic diagram showing an exemplary configuration of a polarization mode dispersion compensating device according to the second embodiment of the present invention.

FIG. 5 shows a polarization mode dispersion compensating device according to the second embodiment of the present invention, which has an input optical fiber 201, an input optical pulse 202, a TE or TM polarization component 203 of the input optical pulse 202, a TM or TE polarization component 204 of the input optical pulse 202, a polarization controller 205, an optical fiber 206 with a particularly large polarization mode dispersion such as the polarization maintaining fiber, a TE or TM polarization component 207, a TM or TE polarization component 208, an optical coupler 209, an optical waveguide 210, an output optical fiber 211, a polarization beam splitter 212, optical waveguides 213 and 214, a cross phase modulation type wavelength converter 215, a light source 216 of the wavelength converter 215, optical waveguides 217 and 218, a photodetector 219, a control system 220 of the polarization controller 205, a waveform reshaped optical pulse 223, a TE or TM polarization component 221 of the optical pulse 223, and a TM or TE polarization component 222 of the optical pulse 223. These elements 201 to 223 are the same as the corresponding elements shown in FIG. 3 and their operation principles are also the same.

Then, a polarization mode dispersion equalizer is formed by the polarization controller 205 and the optical fiber (polarization maintaining fiber) 206 with a particularly large polarization mode dispersion.

In the second embodiment, the drawback of the first embodiment is resolved by further providing an optical coupler 224, a polarization beam splitter 225, optical waveguides 226 and 227, a cross phase modulation type wavelength converter 228, a light source 229, optical waveguides 230 and 231, and a photodetector 232.

Here, a part of the optical signal is split by the optical coupler 224 provided between the polarization controller 205 and the optical fiber 206, further split by the polarization beam splitter 225 into the optical waveguides 226 and 227 that have the same optical length, and then entered into the wavelength converter 228. Similarly as described above, the wavelength converter 228 operates as the XOR circuit.

In the case of the desirable state A, the optical signal levels of the polarization components 203 and 204 are not equal at the photodetector 232, but the optical signal levels of the polarization components 203 and 204 are equal at the photodetector 219. Namely, it can be ascertained that as the state A if the photodetector 232 is not minimum when the photodetector 219 is adjusted to be minimum. On the other hand, in the case of the undesirable state B, the photodetector 232 becomes minimum when the photodetector 219 is adjusted to be minimum. This state is the undesirable state so that the control system 220 further adjusts the polarization controller 205 to control the polarization state of the input optical pulse 202 such that it becomes the state A.

Note that, in FIG. 5, it is also possible to connect the light source 216 to the optical waveguide 217, and it is also possible to connect the light source 229 to the optical waveguide 230.

Note also that the first and second embodiments shown in FIG. 3 to FIG. 5 have a possibility of falling into the following undesirable state. Namely, the XOR circuit (the wavelength converter 115 or 215) can operate normally when the optical powers of the TE polarization component and the TM polarization component entered into the input optical fiber 101 or 201 are equal or the optical power difference is small (about 3 dB, for example) so that the polarization mode dispersion can be compensated, but when the optical power difference becomes more than 3 dB, there is a possibility that the XOR circuit (the wavelength converter 115 or 215) does not operate normally as it is pulled only to the polarization component with the higher optical power.

In the actual optical transmission path, the optical power difference between these polarization components is large, and can be as large 20 dB sometimes. In such cases, the polarization mode dispersion compensating device of the first and second embodiments shown in FIG. 3 to FIG. 5 cannot compensate the polarization mode dispersion. In such a case where the optical power difference between the TE and TM polarization components is large, the third embodiment to be described next can be used.

Third Embodiment

Figure 6:
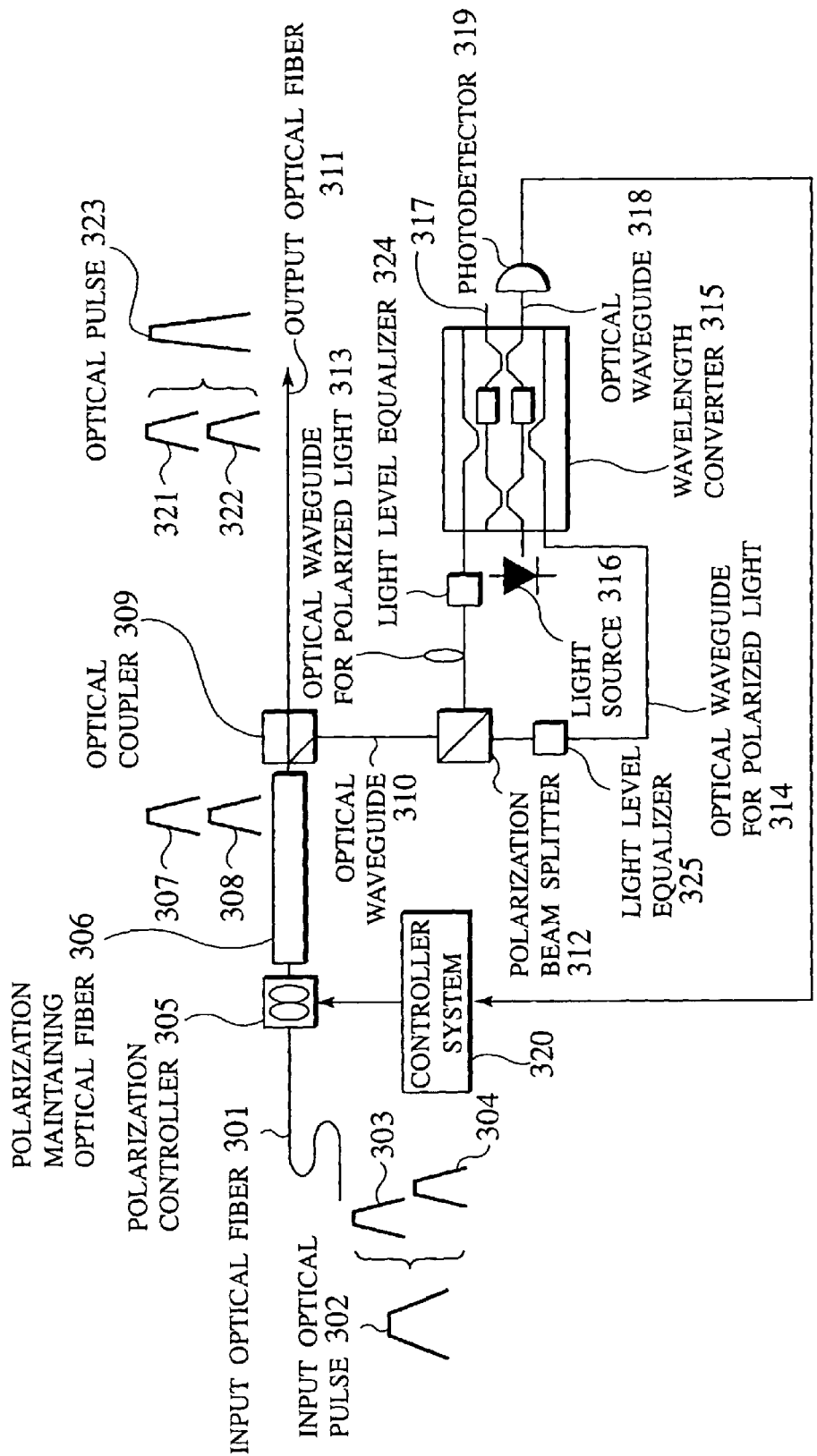
FIG. 6 is a schematic diagram showing an exemplary configuration of a polarization mode dispersion compensating device according to the third embodiment of the present invention.

FIG. 6 shows a polarization mode dispersion compensating device according to the third embodiment of the present invention, which has an input optical fiber 301, an input optical pulse 302, a TE or TM polarization component 303 of the input optical pulse 302, a TM or TE polarization component 304 of the input optical pulse 302, a polarization controller 305, an optical fiber 306 with a particularly large polarization mode dispersion such as the polarization maintaining fiber, a TE or TM polarization component 307, a TM or TE polarization component 308, an optical coupler 309 with one input and two outputs, an optical waveguide 310, an output optical fiber 311, a polarization beam splitter 312, optical waveguides for polarized light 313 and 314, a cross phase modulation type wavelength converter 315, a light source 316 of the wavelength converter 315, optical waveguides 317 and 318, a photodetector 319 for detecting only an average output, a control system 320 of the polarization controller 305, a waveform reshaped optical pulse 323, a TE or TM polarization component 321 of the optical pulse 323, and a TM or TE polarization component 322 of the optical pulse 323.

In addition, this polarization mode dispersion compensating device also has an optical power equalizer 324 equipped on (provided in a middle of) the optical waveguide 313 and an optical power equalizer 325 equipped on (provided in a middle of) the optical waveguide 314. The optical power equalizers 324 and 325 have a function for outputting the output lights at intensities within a prescribed range even when the input lights have different intensities. Its detailed characteristic will be described below with reference to FIG. 7.

Then, a polarization mode dispersion equalizer is formed by the polarization controller 305 and the optical fiber (polarization maintaining fiber) 306 with a particularly large polarization mode dispersion.

The polarization mode dispersion compensating device of FIG. 6 uses a scheme for compensating the polarization mode dispersion by adjusting the polarization state of the input optical pulse 302 by controlling the polarization controller 305 at the control system 320 such that the delayed polarization component 303 will be entered into a fast propagation direction of the optical fiber 306 while the advancing polarization component 304 will be entered into a slow propagation direction of the optical fiber 306.

Here, a part of the optical signal is split by the optical coupler 309, and its polarization components are further split by the polarization beam splitter 312. As a result, the TE or TM polarization component is outputted to the optical waveguide for polarized light 313 while the TM or TE polarization component is outputted to the optical waveguide for polarized light 314. Then, they are separately entered into two signal input ports of the wavelength converter 315, through the optical waveguide for polarized light 313 and the optical waveguide for polarized light 314 which are set to have the same optical length.

The wavelength converter 315 is a cross phase modulation type wavelength converter, which outputs a continuous light from the light source 316 to the optical waveguide 317 when both of the optical waveguides for polarized light 313 and 314 have the optical signal level of "0" level. Namely, in this case, the optical signal level of the output side optical waveguide 318 is "0" level.

On the other hand, when the optical signal level of either one of the optical waveguides for polarized light 313 and 314 becomes "1" level, the optical signal level of the output side optical waveguide 318 becomes "1" level according to the operation principle of the waveguide converter 315.

When both of the optical waveguides for polarized light 313 and 314 have the optical signal level of "1" level, they cancel each other and the optical signal level of the output side optical waveguide 318 becomes "0" level.

The optical power of the polarization component entered into the wavelength converter 315 through the optical power equalizer 324 and the optical power of the polarization component entered into the wavelength converter 315 through the optical power equalizer 325 are set to have values within a prescribed range and nearly constant.

Consequently, even when there is a large difference between the optical powers of the TE polarization component and the TM polarization component that are split by the polarization beam splitter 312 and entered into the optical waveguides for polarized light 313 and 314, the optical power of the polarization component entered into the wavelength converter 315 through the optical power equalizer 324 and the optical power of the polarization component entered into the wavelength converter 315 through the optical power equalizer 325 become nearly equal, so that: (1) when the input timings of the polarization component entered into the optical waveguide for polarized light 313 and the polarization component entered into the optical waveguide for polarized light 314 are the same, the optical signal level of the optical waveguide 318 becomes "0" level, and (2) when the input timings of the polarization component entered into the optical waveguide for polarized light 313 and the polarization component entered into the optical waveguide for polarized light 314 are different, the optical signal level of the optical waveguide 318 becomes "1" level.

In other words, even when there is a large difference between the optical powers of the TE polarization component and the TM polarization component that are split by the polarization beam splitter 312 and entered into the optical waveguides for polarized light 313 and 314, it is possible to realize the XOR operation at the wavelength converter 315.

The photodetector 319 outputs an electric signal according to the detected optical power, so that the control system 320 adjusts the polarization controller 305 to control the polarization state of the input optical pulse 302 such that the intensity of the electric signal outputted from the photodetector 319 is minimized (i.e., the detected optical power is minimized), so as to minimize the polarization mode dispersion, i.e., to minimize a difference between the differential group delays of the polarization component 321 and the polarization component 322. By such a control operation, it is possible to obtain the waveform reshaped optical pulse 323. Moreover, even when there is a large difference between the optical powers of the polarization component 303 and the polarization component 304, it is possible to realize the XOR operation and it is possible to obtain the waveform reshaped optical pulse 323.

Note that, in FIG. 6, it is also possible to connect the light source 316 to the optical waveguide 317.

Characteristic of the Optical Power Equalizer

Figure 7:
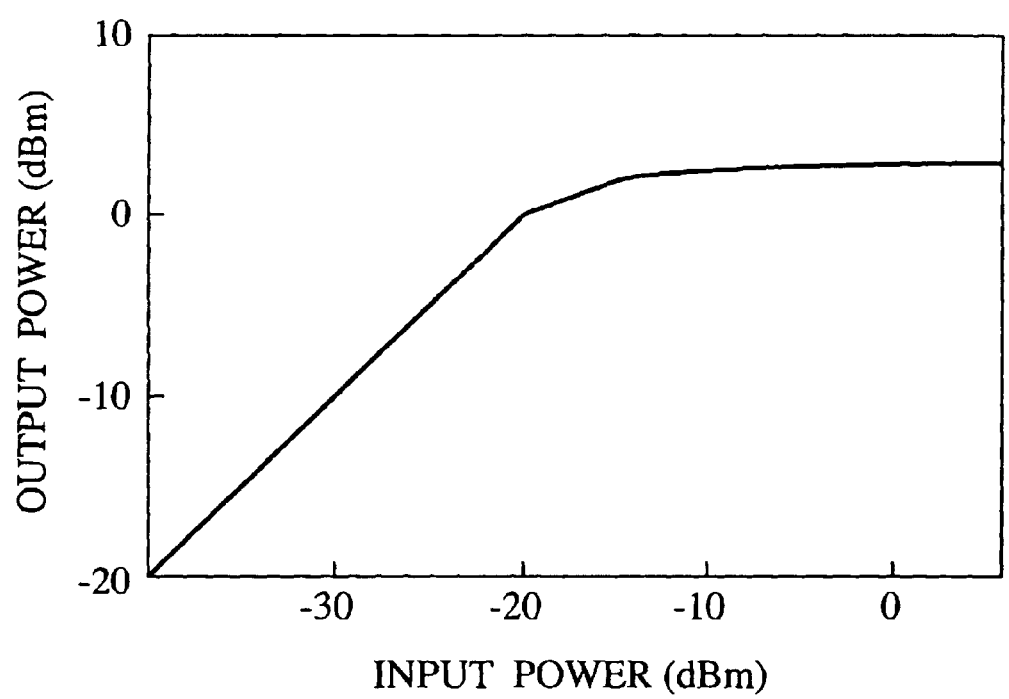
FIG. 7 is a graph showing a characteristic of an optical power equalizer used in the polarization mode dispersion compensating device of FIG. 6.

FIG. 7 shows a characteristic diagram showing the characteristic of the optical power equalizers 324 and 325 in the third embodiment, and more specifically, FIG. 7 shows output power versus input power for a semiconductor optical amplifier with an amplification of 20 dB and a saturation output of 3 dBm. From FIG. 7, it can be seen that the output intensity is contained within a range of 0 to +3 dBm for any input intensity that exceeds −20 dBm. Namely, for example, even when there is an optical power difference over 20 dB as in the case where the input optical powers are −20 dBm and 0 dBm, the output optical power can be contained within a range of 0 to +3 dBm as a result of the light level adjustment.

Note that, usually, when the semiconductor optical amplifier is used as the optical power equalizer in this way, there arises a problem of the waveform distortion due to the so called pattern effect in which the amplification varies according to the signal pattern, but in the present invention, only the average output at the photodetector 319 is detected so that the distortion of the waveform does not give rise to any problem.

Note also that when the amplification of 20 dB is difficult to achieve by a single stage of the semiconductor optical amplifier, it is also possible to use a cascade connection in two stages or three stages of the semiconductor optical amplifiers.

Also, the optical amplifier with a high amplification is adopted in the case of the optical transmission system in which the input optical power is low, and the optical amplifier with a low amplification is adopted in the case of the optical transmission system in which the input optical power is high.

It is also possible to provide the optical power equalizer by using an optical fiber amplifier or the like instead of the semiconductor optical amplifier.

Fourth Embodiment

Figure 8:
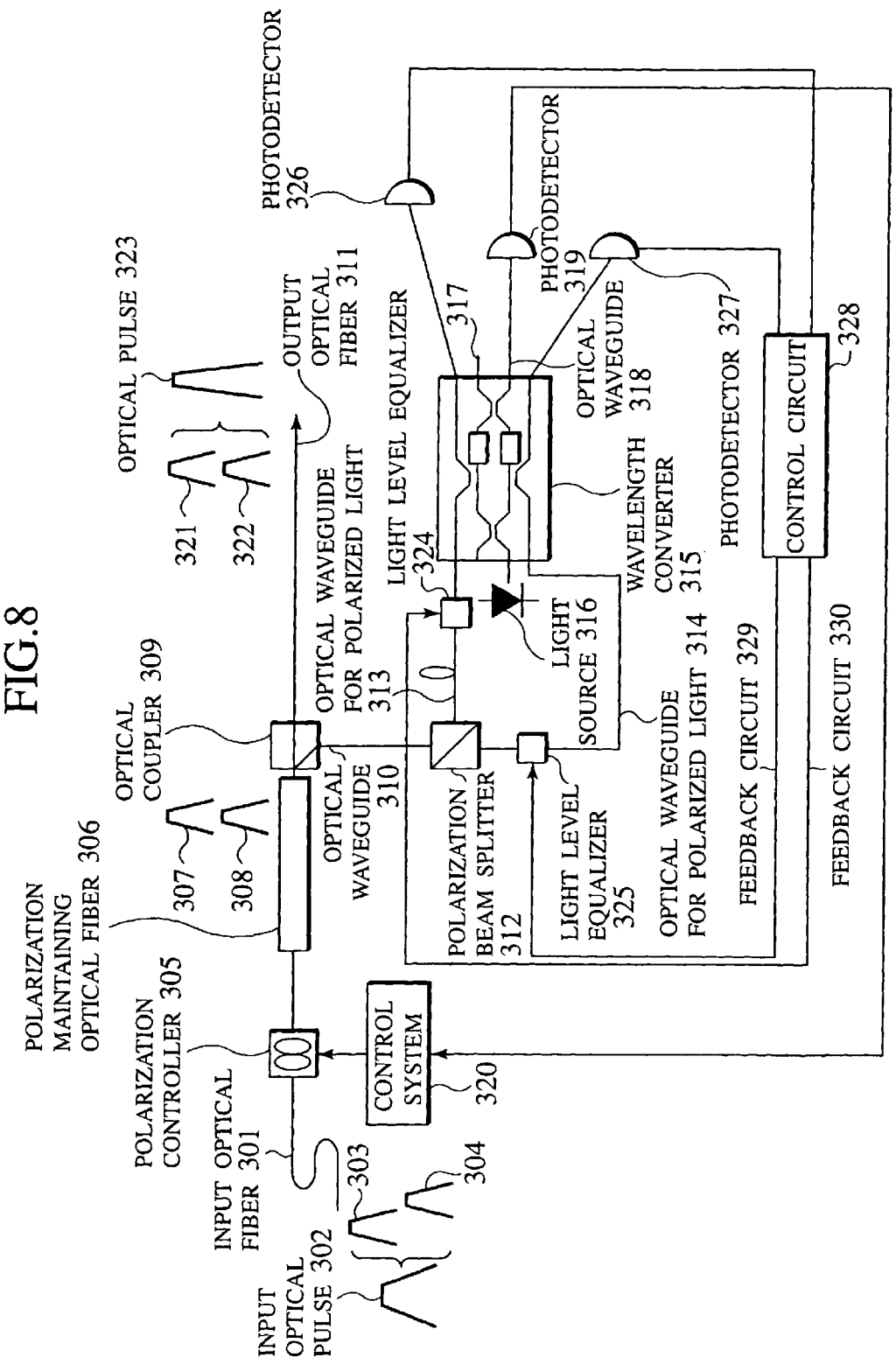
FIG. 8 is a schematic diagram showing an exemplary configuration of a polarization mode dispersion compensating device according to the fourth embodiment of the present invention.

FIG. 8 shows a polarization mode dispersion compensating device according to the fourth embodiment of the present invention. This embodiment uses a configuration in which the polarization mode dispersion compensating device of the third embodiment shown in FIG. 6 is further provided with photodetectors 326 and 327, a control circuit 328, and feedback circuits 329 and 330.

The polarization component to be entered into the wavelength converter 315 through the optical power equalizer 324 is entered into the photodetector 326, and the photodetector 326 outputs an electric signal according to the intensity of this polarization component. Also, the polarization component to be entered into the wavelength converter 315 through the optical power equalizer 325 is entered into the photodetector 327, and the photodetector 327 outputs an electric signal according to the intensity of this polarization component. The control circuit 328 can monitor the intensity of the polarized light entered into the wavelength converter 315 through the optical waveguide for polarized light 313 and the intensity of the polarized light entered into the wavelength converter 315 through the optical waveguide for polarized light 314, by monitoring the electric signals from the photodetector 326 and the photodetector 327.

Then, the control circuit 328 adjusts the amplifications of the optical power equalizers 324 and 325 individually through the feedback circuits 329 and 330 such that a difference between the intensities of these polarized lights becomes minimum. In other words, the amplifications are raised by increasing currents of the optical power equalizers 324 and 325 when the optical powers are low, and the amplifications are lowered by decreasing currents of the optical power equalizers 324 and 325 when the optical powers are high. By such an optical power adjustment control, the intensity of the polarized light entered into the wavelength converter 315 through the optical waveguide for polarized light 313 and the intensity of the polarized light entered into the wavelength converter 315 through the optical waveguide for polarized light 314 can be made to coincide more accurately, and it becomes possible to control the polarization mode dispersion more accurately.

Fifth Embodiment

Figure 9:
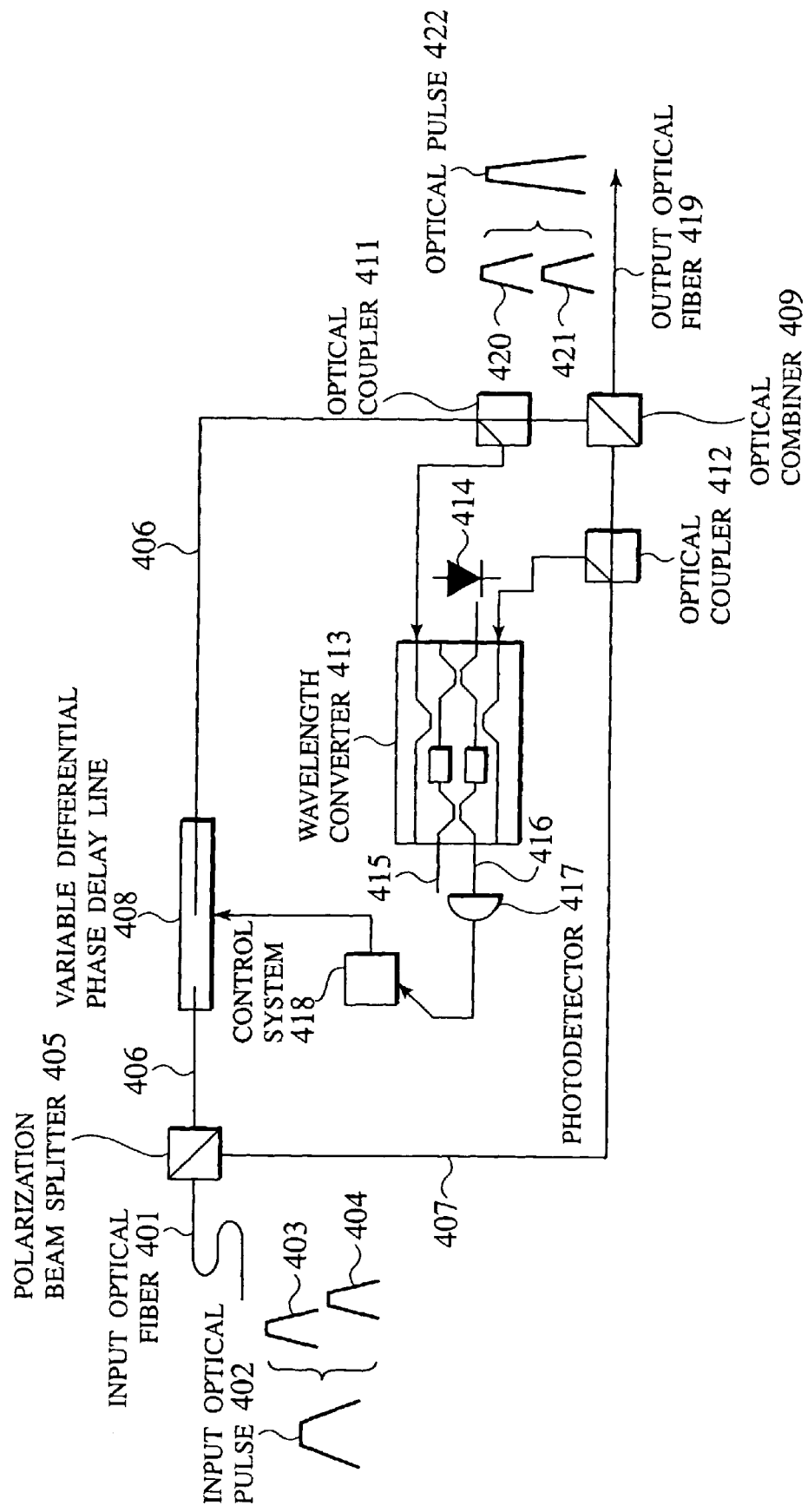
FIG. 9 is a schematic diagram showing an exemplary configuration of a polarization mode dispersion compensating device according to the fifth embodiment of the present invention.

FIG. 9 shows a polarization mode dispersion compensating device according to the fifth embodiment of the present invention, which has an input optical fiber 401, an input optical pulse 402, a TE or TM polarization component 403 of the input optical pulse 402, a TM or TE polarization component 404 of the input optical pulse 402, a polarization beam splitter 405, optical waveguides 406 and 407, a variable differential phase delay line 408 provided in a middle of the optical waveguide 406, an optical combiner 409, optical couplers 411 and 412, a cross phase modulation type wavelength converter 413, a light source 414 of the wavelength converter 413, optical waveguides 415 and 416, a photodetector 417, a control system 418 of the variable differential phase delay line 408, an output optical fiber 419, a waveform reshaped optical pulse 422, a TE or TM polarization component 420 of the optical pulse 422, and a TM or TE polarization component 421 of the optical pulse 422.

In this embodiment, a polarization mode dispersion equalizer is formed by the polarization beam splitter 405, the optical waveguides 406 and 407, the variable differential phase delay line 408, and the optical combiner 409.

The fifth embodiment shown in FIG. 9 uses a scheme for compensating the polarization mode dispersion by splitting the input optical pulse 402 at the polarization beam splitter 405 such that the delayed (or advancing) polarization component 403 is entered into the optical waveguide 406 while the polarization component 404 is entered into the optical waveguide 407, and adjusting the variable differential phase delay line 408 such that the optical length of the delayed (or advancing) polarization component 403 becomes shorter (or longer).

Here, a part of the optical signal is split by the optical couplers 411 and 412, and entered into the wavelength converter 413 through the optical waveguides of the same optical length. As described before, the wavelength converter 413 operates as the XOR circuit, so that the control system 418 controls the differential phase delay amount by the variable differential phase delay line 408 such that the output value of the optical waveguide 416 is minimized, so as to minimize the polarization mode dispersion, i.e., to minimize a difference between the differential group delays of the polarization component 420 and the polarization component 421. In this way, it is possible to obtain the waveform reshaped optical pulse 422.

Figure 10:
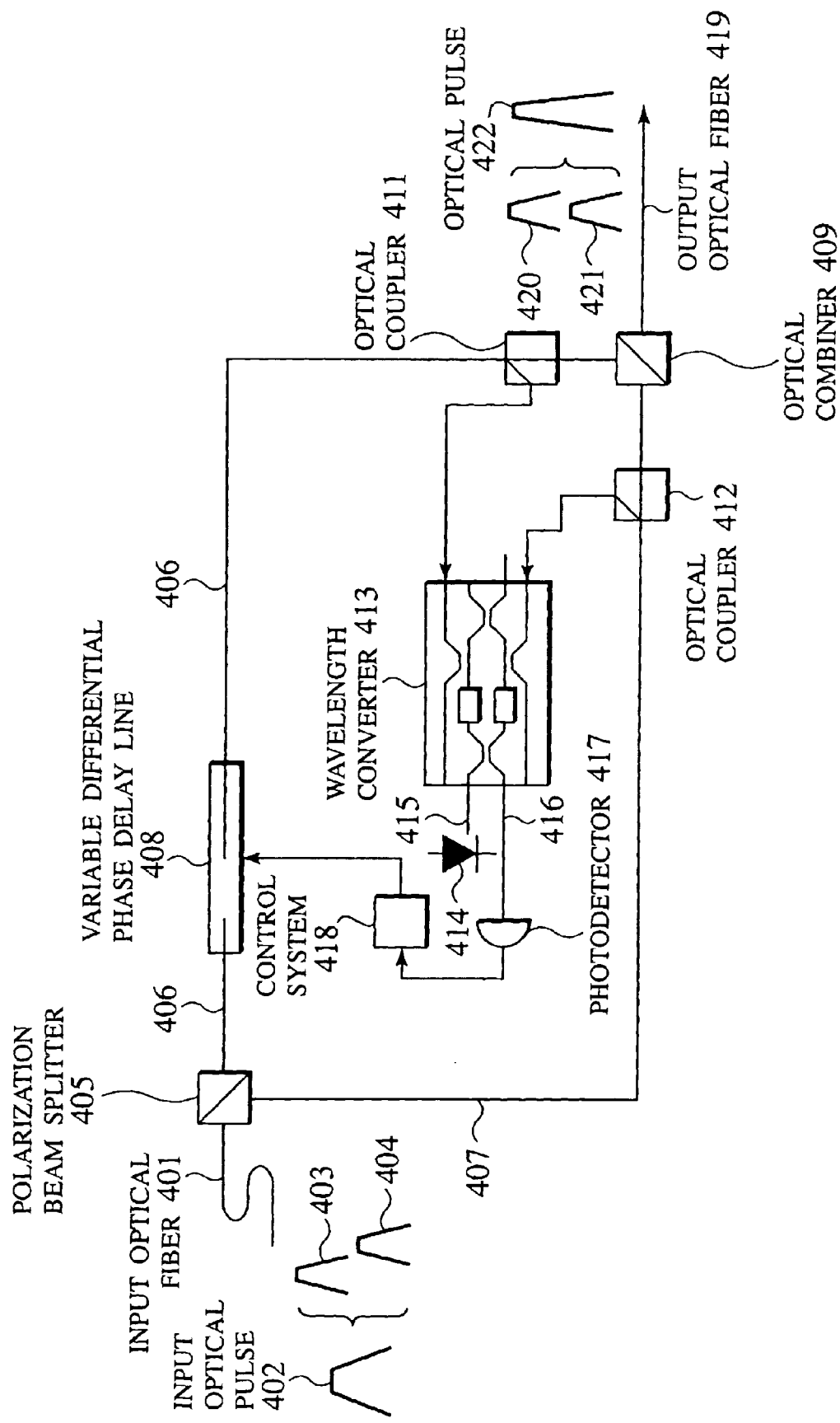
FIG. 10 is a schematic diagram showing a modified configuration of a polarization mode dispersion compensating device according to the fifth embodiment of the present invention.

Note that the operation similar to that of FIG. 9 can also be realized by a configuration shown in FIG. 10, in which the light source 414 is connected to the optical waveguide 415 such that the optical pulses (TE polarization component and TM polarization component) and the lights from the light source 414 have opposite propagation directions in the wavelength converter 413.

Note however that the fifth embodiment shown in FIG. 9 and FIG. 10 has a drawback that the polarization state is not necessarily one that can be neatly split to enter the polarization component 403 into the optical waveguide 406 and the polarization component 404 into the optical waveguide 407. This drawback can be resolved by the sixth embodiment to be described next.

Sixth Embodiment

Figure 11:
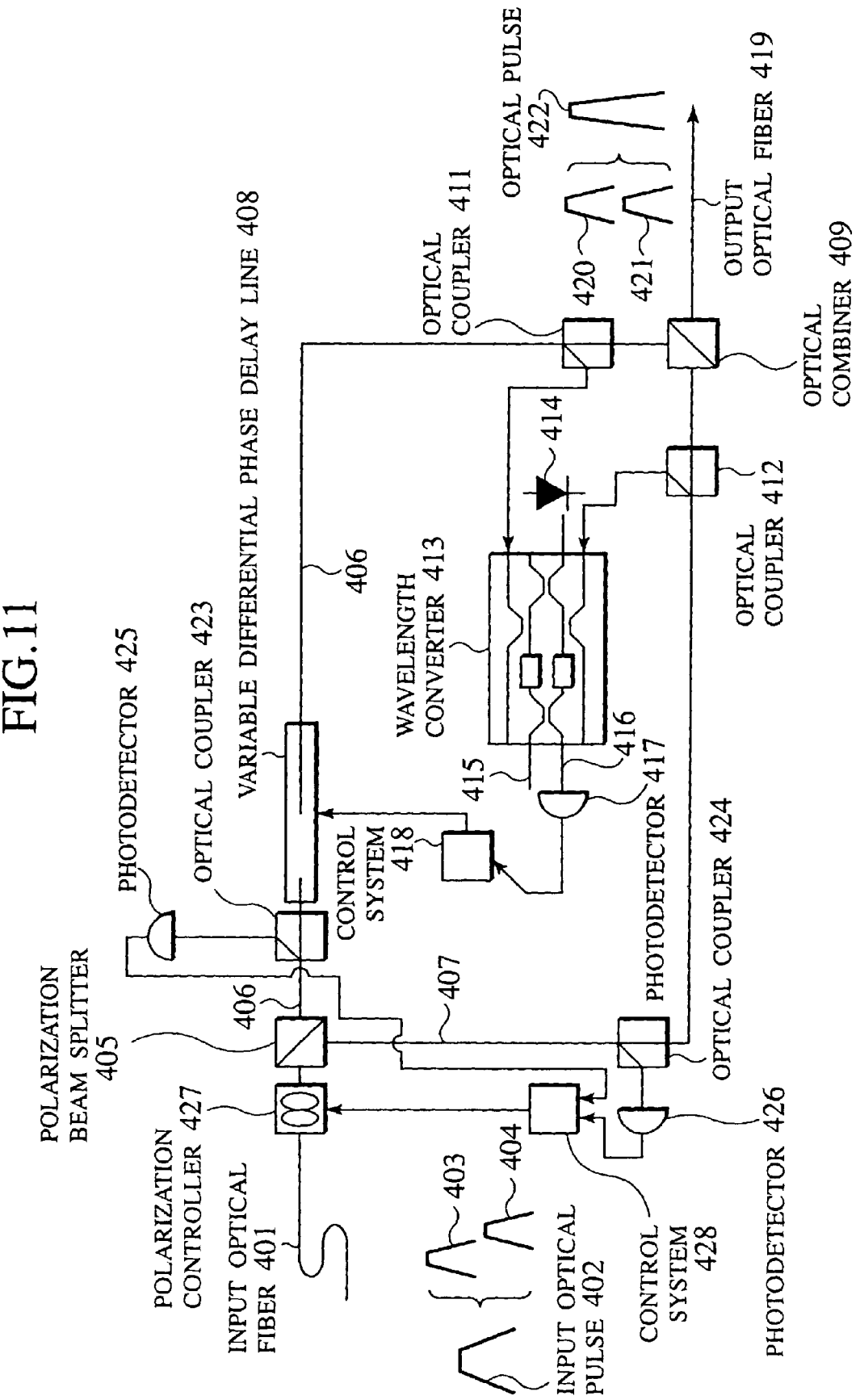
FIG. 11 is a schematic diagram showing an exemplary configuration of a polarization mode dispersion compensating device according to the sixth embodiment of the present invention.

FIG. 11 shows a polarization mode dispersion compensating device according to the sixth embodiment of the present invention, which has an input optical fiber 401, an input optical pulse 402, a TE or TM polarization component 403 of the input optical pulse 402, a TM or TE polarization component 404 of the input optical pulse 402, a polarization beam splitter 405, optical waveguides 406 and 407, a variable differential phase delay line 408 provided in a middle of the optical waveguide 406, an optical combiner 409, optical couplers 411 and 412, a cross phase modulation type wavelength converter 413, a light source 414 of the wavelength converter 413, optical waveguides 415 and 416, a photodetector 417, a control system 418 of the variable differential phase delay line 408, an output optical fiber 419, a waveform reshaped optical pulse 422, a TE or TM polarization component 420 of the optical pulse 422, and a TM or TE polarization component 421 of the optical pulse 422. These elements 401 to 422 are the same as the corresponding elements shown in FIG. 9 and their operation principles are also the same.

Then, in this embodiment, a polarization mode dispersion equalizer is formed by the polarization beam splitter 405, the optical waveguides 406 and 407, the variable differential phase delay line 408, and the optical combiner 409.

In the sixth embodiment, the drawback of the fifth embodiment is resolved by further providing optical couplers 423 and 424, photodetectors 425 and 426, a polarization controller 427, and a control system 428.

Namely, parts of the optical signals propagating through the optical waveguides 406 and 407 are split by the optical couplers 423 and 424, the intensities of the split optical signals are measured at the photodetectors 425 and 426, and the control system 428 adjusts the polarization controller 427 to control the polarization state of the input optical pulse 402 such that a difference between these intensities becomes minimum. In this way, it is possible to obtain the polarization state that can be neatly split to enter the polarization component 403 into the optical waveguide 406 and the polarization component 404 into the optical waveguide 407.

Note that, in FIG. 11, it is also possible to connect the light source 416 to the optical waveguide 415.

The remarkable feature of the present invention is that any of the cross phase modulation type wavelength converter 115, 215, 228, 315 and 413 of FIGS. 3–6 and 8–11 has no need to follow the input signal. Namely, there is no need for the XOR operation to follow one bit by one bit, and it suffices to detect the average value. The same remark also applies to the photodetectors 119, 219, 232, 319, 326, 327, 417, 425 and 426. Thus each configuration according to the present invention operates on the average output power of the optical signals, and does not depend on the bit rate. Also, even when "10" codes appear consecutively, the feedback system is not affected. Moreover, it is possible to use inexpensive low speed photodetectors.

Other Examples of the Polarization Mode Dispersion Equalizer

In the embodiments described above, the polarization mode dispersion equalizer is provided in a form of: (a) a combination of the polarization controller (polarization rotator) and an optical fiber with a particularly large polarization mode dispersion (the polarization maintaining fiber, for example) (see FIGS. 3–6 and 8), or (b) a combination of a polarization beam splitter, two optical waveguides, a variable differential phase delay line provided in a middle of one optical waveguide, and an optical combiner (see FIGS. 9–11). However, it is also possible to use the other types of the polarization mode dispersion equalizer. In the following, the other examples of the polarization mode dispersion equalizer will be described.

Polarization Mode Dispersion Equalizer Using PLC

Figure 12:
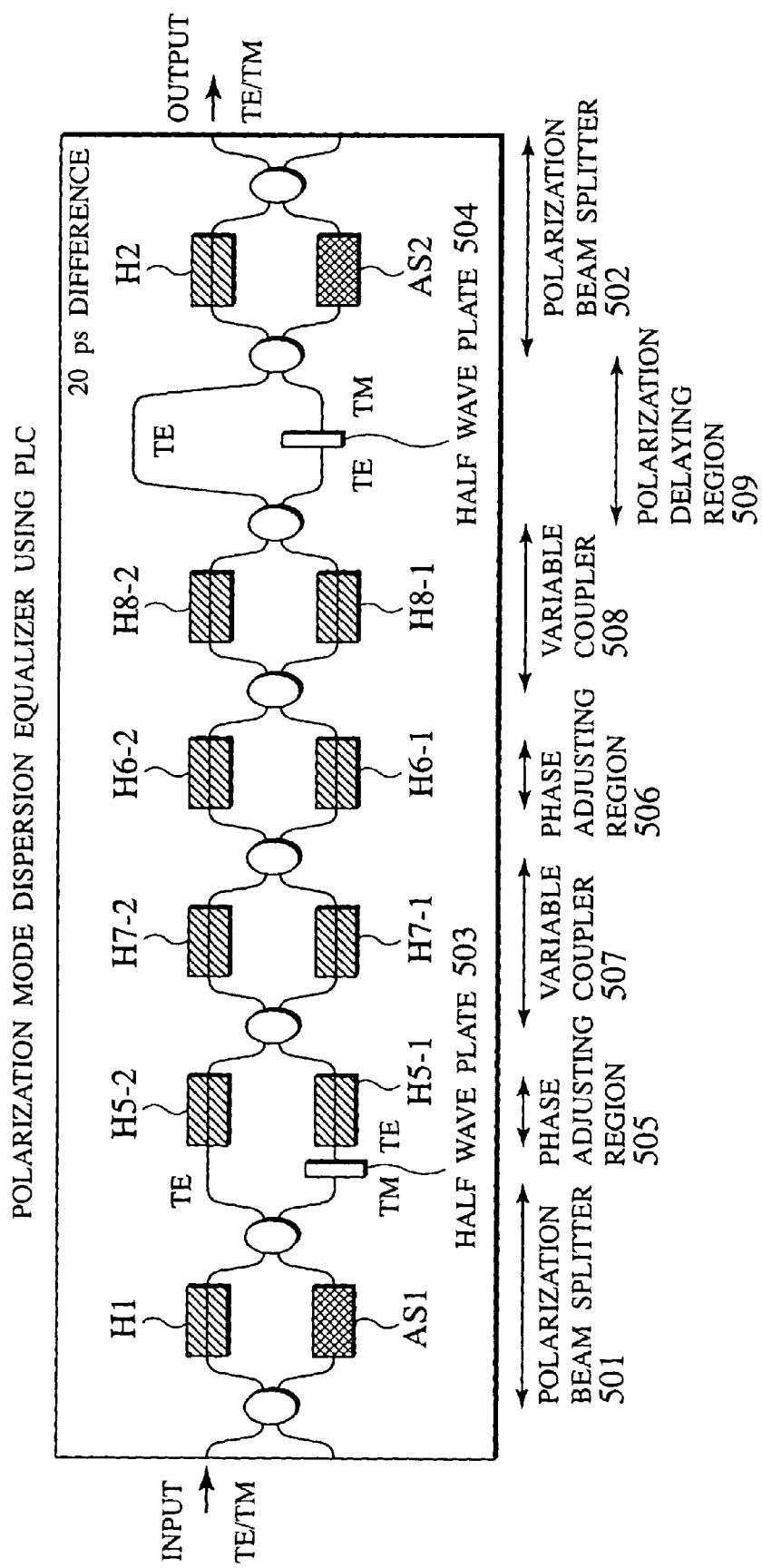
FIG. 12 is a schematic diagram showing an exemplary configuration of a polarization mode dispersion equalizer using PLC that can be used in the polarization mode dispersion compensating device of the present invention.

The polarization mode dispersion equalizer using PLC (Planar Lightwave Circuit: silica based waveguide on a silicone substrate) will now be described with reference to FIG. 12. This type of the polarization mode dispersion equalizer is disclosed in T. Saida, et al., "Planar Lightwave Circuit Polarization Mode Compensator", ECOC 2001, Amsterdam, and comprises two polarization beam splitters 501 and 502, two half wave plates 503 and 504, two phase adjusting regions 505 and 506, two variable couplers 507 and 508, and one polarization delaying region 509. More specifically, it has a configuration in which a first polarization beam splitter 501, a first phase adjusting region 505, a first variable coupler 507, a second phase adjusting region 506, a second variable coupler 508, a polarization delaying region 509, and a second polarization beam splitter 502 are connected in series in this order.

The polarization beam splitter 501 (502) is formed by providing amorphous silicone A1 (A2) on one waveguide and a heater H1 (H2) on the other waveguide of a symmetrical Mach-Zehnder interferometer, and decouples (couples) the TE and TM polarization components.

The variable coupler 507 (508) also has a structure of a symmetric Mach-Zehnder interferometer, and is capable of varying the splitting ratio of the optical signal by adjusting the electric powers applied to heaters H7-1 and H7-2 (H8-1 and H8-2) provided on two waveguides.

The phase adjusting region 505 (506) also has a structure of a symmetric Mach-Zehnder interferometer, and has heaters H5-1 and H5-2 (H6-1 and H6-2) provided on two waveguides, for changing the phases of the optical signals.

The half wave plate 503 is provided in a middle of the lower waveguide of the phase adjusting region 505 at a position closer to the input side than the heater H5-1, and the half wave plate 504 is provided in a middle of the shorter waveguide of the polarization delaying region 509. The half wave plates 503 and 504 have a function for inverting the TE polarization into the TM polarization, or the TM polarization into the TE polarization.

The polarization delaying region 509 is formed by two waveguides of different lengths, and a difference between the differential group delays of the optical signals propagating through them is set to be 20 ps.

The polarization mode dispersion equalizer shown in FIG. 12 operates as follows. The entered optical signal is separated into the TE polarization and the TM polarization by the first polarization beam splitter 501. In addition, the TM polarization is converted into the TE polarization by the half wave plate 503. Namely, the input signal is separated into the TE polarization component and the TM polarization component (whose polarization is however TE polarization).

These TE polarization component and TM polarization component are guided to the two phase adjusting regions 505 and 506 and two variable couplers 507 and 508. Here, by adjusting the electric powers to be applied to the heaters H5-1, H5-2, H6-1, H6-2, H7-1, H7-2, H8-1 and H8-2 (and thereby adjusting the amounts of heat generation) to change the splitting ratio of the phase adjusting regions 505 and 506 and the variable couplers 507 and 508, it is possible to freely change the ratio of the TE polarization component and the TM polarization component (whose polarization is however TE polarization). This corresponds to the changing of the ratio of the TE polarization component and the TM polarization component by adjusting the polarization controller in the polarization mode dispersion equalizer of the type (a) noted above.

Then, the TE polarization component is entered into a longer waveguide of the polarization delaying region 509, while the TM polarization component (whose polarization is however TE polarization) is entered into a shorter waveguide of the polarization delaying region 509. The different in the propagation time of these waveguides is 20 ps, so that the TE polarization component will be delayed for 20 ps. This corresponds to the delaying of one polarization component with respect to the other polarization component by using the polarization maintaining fiber in the polarization mode dispersion equalizer of the type (a) noted above.

Note that the TM polarization component (with TE polarization) is converted back to the TM polarization by the half wave plate 504, and the TE polarization component and the TM polarization component are combined and outputted by the polarization beam splitter 502.

This configuration is basically equivalent to the polarization mode dispersion equalizer of the type (a) noted above which compensates the polarization mode dispersion by the polarization controller (polarization rotator) and the polarization maintaining fiber. Namely, the phase adjusting region 505 and the variable coupler 507 correspond to the polarization controller, and the polarization delaying region 509 corresponds to the polarization maintaining fiber.

Polarization Mode Dispersion Equalizer Using LN

The polarization mode dispersion equalizer using LN (LiNbO$_3$) will now be described with reference to FIG. 13. This type of the polarization mode dispersion equalizer is disclosed in R. Noe, et al., "Integrated optical LiNbO$_3$ distributed polarization mode dispersion compensator in 20 Gb/s transmission system", Electronics Letters, Vol. 35, No. 8, pp. 652–654, 1999, and formed by arranging comb shaped electrodes 601$a$ and 601$b$ to which a voltage V1 is to be applied, an earth electrode 602 at 0 V, and comb shaped electrodes 603$a$ and 603$b$ to which a voltage V2 is to be applied. More specifically, the comb shaped electrodes 603$a$, 601$a$, 603$b$, 601$b$ are arranged in this order, and the earth electrode 602 is arranged between each adjacent ones of the comb shaped electrodes 603$a$, 601$a$, 603$b$ and 601$b$, as well as between each adjacent teeth of each comb shaped electrode.

Figure 13:
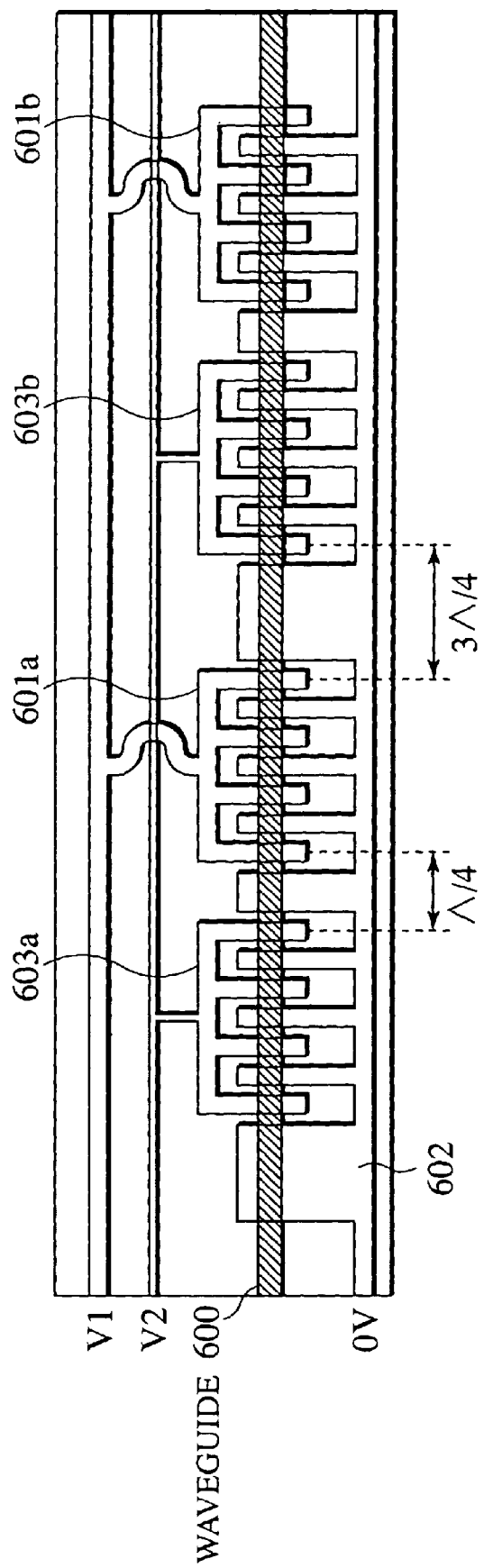
FIG. 13 is a schematic diagram showing an exemplary configuration of a polarization mode dispersion equalizer using LN that can be used in the polarization mode dispersion compensating device of the present invention.

When the beat length of the optical signal is Λ, the intervals between the comb shaped electrodes are set to be Λ/4 and 3Λ/4 as shown in FIG. 13. The LN substrate is cut along the X-axis direction such that the optical signal is propagated along the Y-axis direction. By applying the voltages of ±69 V at V1 and V2, the polarization of the optical signal can be rotated for 45°. The LN waveguide has the polarization mode dispersion of 0.26 ps/mm, so that the polarization mode dispersion of the optical signal can be changed slightly by rotating the optical signal. Noe et al.

have successfully realized the polarization mode dispersion compensation for 43 ps by connecting 73 pairs of comb shaped electrodes in series, where each pair comprises two comb shaped electrodes having intervals of $\Lambda/4$ and $3\Lambda/4$. The insertion loss is approximately 7 dB.

Note that there are various other types of the polarization mode dispersion equalizer besides those described above, and it is also possible to form the polarization mode dispersion compensating device of the present invention by incorporating any one of these polarization mode dispersion equalizers.

For example, it is possible to form the polarization mode dispersion compensating device of the present invention by adopting any one of the various types of the polarization mode dispersion equalizer described above instead of the polarization mode dispersion equalizer using the polarization controller 105 and the optical fiber 106 as shown in FIG. 3. It is also possible to form the polarization mode dispersion compensating device of the present invention by adopting any one of the various types of the polarization mode dispersion equalizer described above instead of the polarization mode dispersion equalizer using the polarization beam splitter 405, the optical waveguides 406 and 407, the variable differential phase delay line 408 and the optical combiner 409 as shown in FIG. 9.

As described, according to the first to sixth embodiments of the present invention, it is possible to provide a polarization mode dispersion compensating device which is capable of changing the bit rate, which does not affect the feedback system even when "10" codes appear consecutively, and which can be formed by using a low speed photodetector.

Also, according to the first to sixth embodiments of the present invention, it is possible to provide a polarization mode dispersion compensating device which is capable of effectively compensating the polarization mode dispersion by using the XOR circuit that can operate normally even when a difference between the optical powers of the TE polarization component and the TM polarization component is large.

Seventh Embodiment

Figure 14:
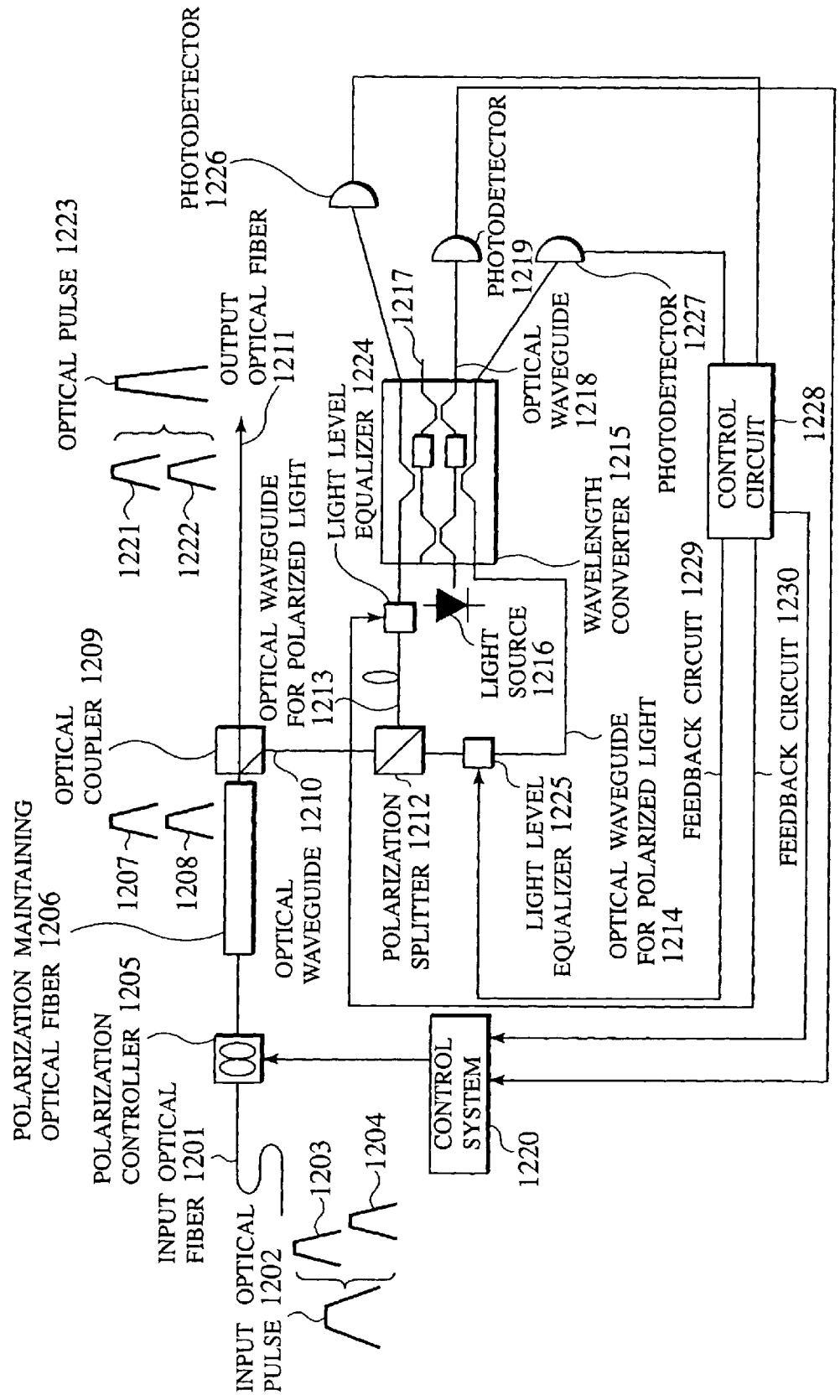
FIG. 14 is a schematic diagram showing an exemplary configuration of a polarization mode dispersion compensating device according to the seventh embodiment of the present invention.

FIG. 14 shows a polarization mode dispersion compensating device according to the seventh embodiment of the present invention, which has an input optical fiber 1201, an input optical pulse 1202, a TE or TM polarization component 1203 of the input optical pulse 1202, a TM or TE polarization component 1204 of the input optical pulse 1202, a polarization controller 1205, an optical fiber 1206 with a particularly large polarization mode dispersion such as the polarization maintaining fiber, a TE or TM polarization component 1207, a TM or TE polarization component 1208, an optical coupler 1209 with one input and two outputs, an optical waveguide 1210, an output optical fiber 1211, a polarization beam splitter 1212, polarized optical waveguides 1213 and 1214, a cross phase modulation type wavelength converter 1215, a light source 1216 of the wavelength converter 1215, optical waveguides 1217 and 1218, a photodetector 1219 that detects only an average output, a control system 1220 of the polarization controller 1205, a waveform reshaped optical pulse 1223, a TE or TM polarization component 1221 of the optical pulse 1223, and a TM or TE polarization component 1222 of the optical pulse 1223.

In addition, the polarization mode dispersion compensating device of the seventh embodiment also has a light level equalizers 1224 and 1225, photodetectors 1226 and 1227, and a control circuit 1228. The light level equalizer 1224 adjusts the optical power of one of the polarization components to be entered into the wavelength converter 1215 through the polarized optical waveguide 1213, and the light level equalizer 1225 adjusts the optical power of the other one of the polarization components to be entered into the wavelength converter 1215 through the polarized optical waveguide 1214. The photodetector 1226 detects the optical power of one of the polarization components outputted from the wavelength converter 1215, and the photodetector 1227 detects the optical power of the other one of the polarization components outputted from the wavelength converter 1215.

The control circuit 1228 controls the light level equalizers 1224 and 1225 such that the optical powers of the two polarization components become equal under the condition that a difference between the optical powers of the two polarization components detected by the photodetectors 1226 and 1227 is less than or equal to a prescribed value (it is not in a special state where either TE or TM polarization component alone is existing in the optical signal).

In further detail, the control circuit 1228 of this embodiment has a function for detecting a difference between the optical powers of the two polarization components detected by the photodetectors 1226 and 1227, judges that it is in the special state when the detected optical power difference exceeds a prescribed value, and carries out the control of the light level equalizers 1224 and 1225 as described above only when the optical power difference is less than or equal to the prescribed value so that it is not in the special state. On the other hand, when it is judged as in the special state, the control circuit 1228 controls the polarization controller 1205 through the control system 1220 such that the difference between the optical powers of the two polarization components becomes maximum.

Figure 15:
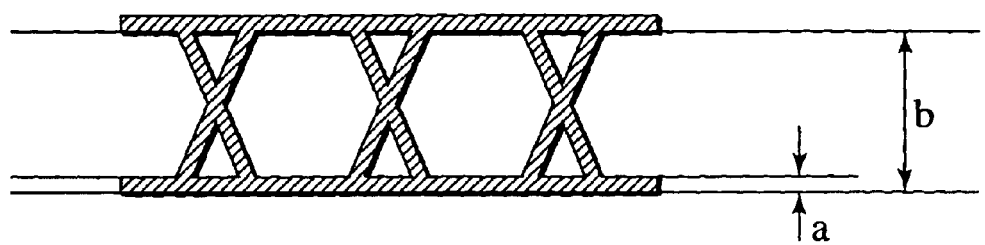
FIG. 15 is a diagram for explaining an exemplary eye pattern of optical signals that can be utilized in the polarization mode dispersion compensating device of FIG. 14.

Here, the prescribed value is set to be the extinction ratio of the eye pattern of the optical signal. Then, it is judged as in the special state when the difference between the optical powers of the two polarization components exceeds the extinction ratio. Note that the extinction ratio is defined as (b/a) in the eye pattern of the optical signal as shown in FIG. 15, where "a" is a level difference between the zero level and a level at which the optical signal of the OFF state is maximally deviated, and "b" is a level difference between the zero level and a level at a center of a deviation width of the optical signal of the ON state. This extinction ratio is usually 10 to 13 dB. Consequently, it is judged as in the special state when the difference between the optical powers of the two polarization components entered into the control circuit 1228 exceeds 13 dB, for example.

The seventh embodiment shown in FIG. 14 uses a scheme for compensating the polarization mode dispersion by adjusting the polarization state of the input optical pulse 1202 by controlling the polarization controller 1205 at the control system 1220 such that the delayed polarization component 1203 will be entered into a fast propagation direction of the optical fiber 1206 while the advancing polarization component 1204 will be entered into a slow propagation direction of the optical fiber 1206.

Here, a part of the optical signal is split by the optical coupler 1209, and its polarization components are further split by the polarization beam splitter 1212. As a result, the TE or TM polarization component is outputted to the polarized optical waveguide 1213 while the TM or TE polarization component is outputted to the polarized optical waveguide 1214. Then, they are separately entered into two signal input ports of the wavelength converter 1215, through the polarized optical waveguide 1213 and the polarized optical waveguide 1214 which are set to have the same optical length.

The wavelength converter 1215 is a cross phase modulation type wavelength converter, which outputs a continuous light from the light source 1216 to the optical waveguide 1217 when both of the polarized optical waveguides 1213 and 1214 have the optical signal level of "0" level. Namely, in this case, the optical signal level of the output side optical waveguide 1218 is "0" level. On the other hand, when the optical signal level of either one of the polarized optical waveguides 1213 and 1214 becomes "1" level, the optical signal level of the output side optical waveguide 1218 becomes "1" level according to the operation principle of the waveguide converter 1215. In addition, when both of the polarized optical waveguides 1213 and 1214 have the optical signal level of "1" level, they cancel each other and the optical signal level of the output side optical waveguide 1218 becomes "0" level.

On the other hand, the polarization component to be entered into the wavelength converter 1215 through the light level equalizer 1224 is entered into the photodetector 1226, and the photodetector 1226 outputs an electric signal according to the intensity of this polarization component. Also, the polarization component to be entered into the wavelength converter 1215 through the light level equalizer 1225 is entered into the photodetector 1227, and the photodetector 1227 outputs an electric signal according to the intensity of this polarization component. The control circuit 1228 can monitor the intensity of the polarized light entered into the wavelength converter 1215 through the polarized optical waveguide 1213 and the intensity of the polarized light entered into the wavelength converter 1215 through the polarized optical waveguide 1214, by monitoring the electric signals from the photodetector 1226 and the photodetector 1227.

Then, the control circuit 1228 adjusts the amplifications of the light level equalizers 1224 and 1225 individually through the feedback circuits 1229 and 1230 such that a difference between the intensities of these polarized lights becomes minimum, under the condition that the difference between the intensities of the two polarization components detected at the photodetectors 1226 and 1227 is less than or equal to the prescribed value (it is not in the special state).

In other words, the amplifications are raised by increasing currents of the light level equalizers 1224 and 1225 when the optical powers are low, and the amplifications are lowered by decreasing currents of the light level equalizers 1224 and 1225 when the optical powers are high. By such an optical power adjustment control, the intensity of the polarized light entered into the wavelength converter 1215 through the polarized optical waveguide 1213 and the intensity of the polarized light entered into the wavelength converter 1215 through the polarized optical waveguide 1214 can be made to coincide more accurately, and it becomes possible to control the polarization mode dispersion more accurately.

Note however that, in the case of controlling the light level equalizers 1224 and 1225 at the control circuit 1228 solely according to the intensity difference between the two polarized lights, the following problem arises. Namely, there is no problem if the optical signal transmitted through the optical waveguide 1210 always has both of the TE and TM polarization components, but the problem arises when there is only one of these polarization components, that is, in the case of the special state. In this special state (when the difference between the optical powers of the two polarization components exceeds 13 dB, for example), one of the polarization components to be entered into the wavelength converter 1215 is at the zero level, and it is impossible to amplify the polarization component at the zero level by raising the amplification of the light level equalizer 1224 or the light level equalizer 1225, such that levels of the two polarization components become equal.

Note that the case where there is either one of the TE and TM polarization components can occur frequently for the following reason. The polarization plane in the input optical fiber 1201 can be changed due to the change in the environmental temperature and the twist caused by the change in the wind force exerted on this input optical fiber 1201 and rotated once in several minutes, and it is rotated once or so everyday. For this reason, there are cases where the two polarization planes coincide, and in such cases it is possible to obtain either one of the TE and TM polarizations alone.

In order to resolve this problem, the control circuit 1228 of this embodiment operates as follows. Namely, when it is detected as the special state, the control circuit 1228 interrupts the control of the light level equalizers 1224 and 1225, and sends a signal indicating that it is in the special state to the control system 1220. When the control system 1220 receives this signal, the control system 1220 controls the polarization controller 1205 such that the difference between the optical powers of the two polarization components becomes maximum. As a result, the optical signal in either one of these polarization components at the maximum level will be outputted through the output optical fiber 1211.

Here, in order to control such that the difference between the optical powers of the two polarization components becomes maximum, the following method can be used. Namely, the polarization controller 1205 is adjusted such that the current for the detected light of either one of the photodetector 1226 and the photodetector 1227 becomes minimum, in an attempt to realize the control that makes the optical power of one of the polarization components zero. By this control, it is also possible to avoid giving the extraneous polarization mode dispersion due to the polarization mode dispersion compensation.

In the above, the judgement of the special state is solely based on the fact that the difference between the optical powers of the TE and TM polarization components exceeds the prescribed value, but there are also rare cases where the difference between the optical powers of the two polarization components exceeds the prescribed value even though it is not in the special state, such as the case where a disconnection of the polarized optical waveguide 1213 or 1214 occurs and the case where a trouble or the like of the light level equalizer 1224 or 1225 occurs. Consequently, when the special state is detected, it is preferable to check these possibilities.

This checking function can be realized by adding the following function to the functions of the control system 1220. Namely, when the control circuit 1228 detects that it is in the special state in which the difference between the optical powers of the two polarization components detected at the photodetectors 1226 and 1227 exceeds the prescribed value, the signal indicating that it is in the special state is sent to the control system 1220, and upon receiving this signal, the control system 1220 controls the polarization controller 1205 such that the polarization planes of the two polarization components are rotated by 90°. More specifically, the half wave plate of the polarization controller 1205 is rotated by 45°.

After this processing, the difference between the optical powers of the two polarization components is detected at the control circuit 1228 again, and when it is in the special state in which the prescribed value is exceeded again, it is judged as the genuine special state. This is because, when it is judged as the special state as there is only the TE polarization component and no TM polarization component initially, for example, there will be only the TM polarization component and no TE polarization component in the second processing after rotating the polarization planes by 90° at the polarization controller 1205, so that the difference between the optical powers of the two polarization components should exceed the prescribed value similarly as before.

The control circuit 1228 sends the signal indicating that it is in the special state again to the control system 1220 after the second judgement processing, and upon receiving this signal for the second time, the control system 1220 regards that it is checked as the genuine special state, and controls the polarization controller 1205 such that the difference between the optical powers of the two polarization components becomes maximum, similarly as described above.

On the other hand, when the difference between the optical powers of the two polarization components is less than or equal to the prescribed value in the second judgement processing, some abnormality such as the disconnection has occurred as described above, and it is also possible to notify this fact, by the flashing of a lamp, for example.

Note that, usually, when the semiconductor optical amplifier is used as the light level equalizer in this way, there arises a problem of the waveform distortion due to the so called pattern effect in which the amplification varies according to the signal pattern, but in the present invention, only the average output at the photodetector 1219 is detected so that the distortion of the waveform does not give rise to any problem.

Note also that when the amplification of 20 dB is difficult to achieve by a single stage of the semiconductor optical amplifier, it is also possible to use a cascade connection in two stages or three stages of the semiconductor optical amplifiers. Also, the optical amplifier with a high amplification is adopted in the case of the optical transmission system in which the input optical power is low, and the optical amplifier with a low amplification is adopted in the case of the optical transmission system in which the input optical power is high. It is also possible to provide the light level equalizer by using an optical fiber amplifier or the like instead of the semiconductor optical amplifier.

As described, according to the seventh embodiment of the present invention, it is possible to provide a polarization mode dispersion compensating device which is capable of effectively compensating the polarization mode dispersion by using the XOR circuit that can operate normally even when a difference between optical powers of the TE polarization component and the TM polarization component is large. In addition, when the level adjustment between the TE polarization component and the TM polarization component becomes impossible as the polarization planes of the two polarization components coincide for some reason, this fact can be detected and it is possible to take an appropriate measure suitable for that special state, such as the adjustment to make one of the polarization components maximum. In addition, when the additional function for checking the genuine special state is provided, it is also possible to detect the abnormal state such as the disconnection of the optical fiber or the like.

Optical XOR Circuit

In the embodiments described above, the optical pulse is split into the TE polarization component and the TM polarization component by the polarization beam splitter at an output end of the optical fiber and the phase states of the TE polarization component and the TM polarization component are detected, and for the purpose of detecting the phase states of the TE polarization component and the TM polarization component, the optical XOR operation is utilized.

Namely, when there is a phase difference between the TE polarization component and the TM polarization component as shown in FIG. 16A, the optical XOR output is obtained, and when there is no phase difference between the TE polarization component and the TM polarization component as shown in FIG. 16B, the optical XOR output becomes zero. By carrying out the optical XOR operation in this way, it is possible to detect the phase states of the polarization components.

There are also cases where the optical XOR circuit for carrying out the optical XOR operation with respect to two optical signals becomes necessary in various types of the optical signal inspection circuit and the optical processing circuit.

In the embodiments described above, the optical XOR operation is carried out by using the optical XOR circuit using a cross phase modulation (XPM) type wavelength converter. This optical XOR circuit will now be described with reference to FIG. 17.

Figure 17:
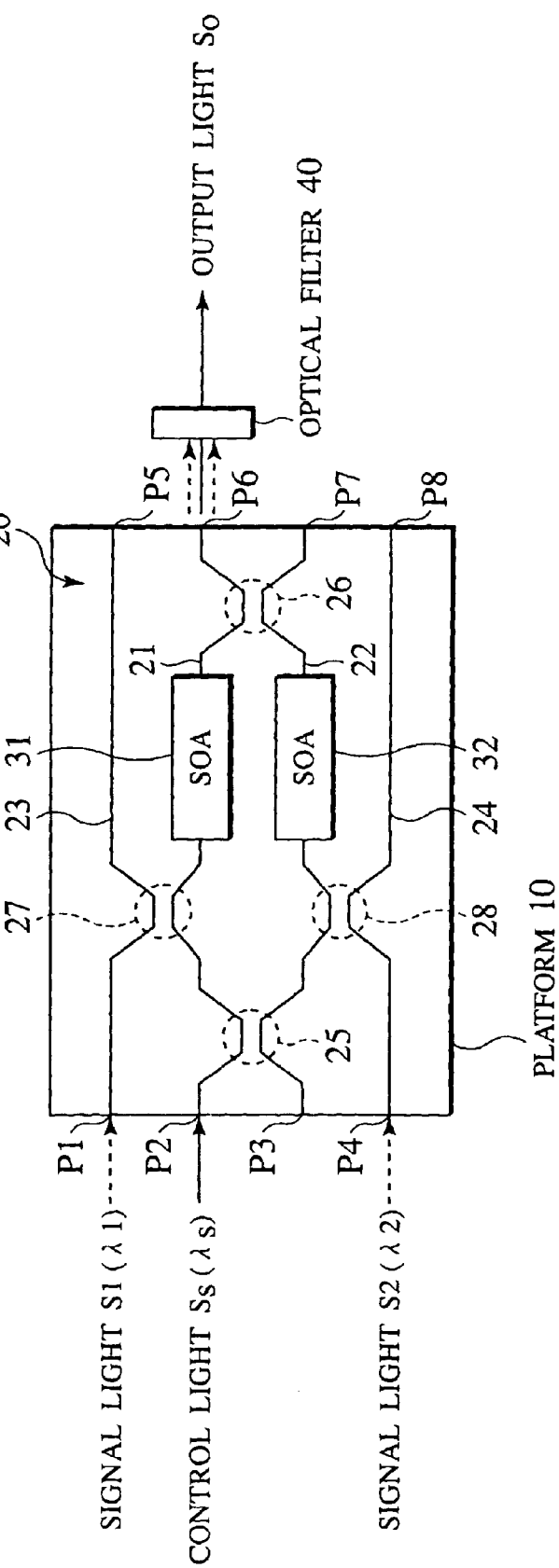
FIG. 17 is a schematic diagram showing one exemplary configuration of an optical XOR circuit that can be used in the polarization mode dispersion compensating device according to the first to seventh embodiment of the present invention.

The optical XOR circuit 1 shown in FIG. 17 is a cross phase modulation (XPM) type wavelength converter. In this optical XOR circuit 1, the symmetric Mach-Zehnder type optical interferometer 20 made by optical waveguides is formed on a plane of a platform 10 formed by a planar lightwave circuit (PLC).

The symmetric Mach-Zehnder type optical interferometer 20 has two optical interference optical waveguides 21 and 22, and two signal optical waveguides 23 and 24. Then, at each of the input end side and the output end side, the optical interference optical waveguides 21 and 22 are bent toward each other to form directional optical couplers (3 dB optical couplers) 25 and 26. Also, the optical interference optical waveguide 21 and the signal optical waveguide 23 are bent toward each other to form a directional optical coupler (3 dB optical coupler) 27, and the optical interference optical waveguides 22 and the signal optical waveguide 24 are bent toward each other to form a directional optical coupler (3 dB optical coupler) 28.

On the Mach-Zehnder type optical interferometer formed by the optical interference optical waveguides 21 and 22, semiconductor optical amplifiers (SOA) 31 and 32 are implemented in a middle of the arm waveguide portions (portions located between the directional optical couplers 25 and 26 on the optical interference optical waveguides 21 and 22). By implementing the semiconductor optical amplifiers 31 and 32 on the Mach-Zehnder type optical interferometer in this way, the XPM type wavelength converter is formed.

In addition, this optical XOR circuit 1 is equipped with an optical filter 40. This optical filter 40 has a filtering characteristic for passing only lights of a wavelength component (wavelength λs) of the control light Ss. Note that, in FIG. 17, P1 to P8 are ports.

When the control light that is a continuous light of wavelength λs is entered at the port P2 of this optical XOR circuit 1, the control light Ss is split by the directional optical coupler 25 that functions as an optical splitter, transmitted through the arm waveguide portions of the optical interference optical waveguides 21 and 22, and entered into the semiconductor optical amplifiers 31 and 32.

When the signal light S1 of wavelength λ1 is entered at the port P1, the signal light S1 is entered into the optical interference optical waveguide 21 through the directional optical coupler 27 and entered into the semiconductor optical amplifier 31. Then, in the semiconductor optical amplifier 31, the carrier density is decreased due to the saturation phenomenon to cause the refractive index change.

Also, when the signal light S2 of wavelength $\lambda 2$ is entered at the port P4, the signal light S2 is entered into the optical interference optical waveguide 22 through the directional optical coupler 28 and entered into the semiconductor optical amplifier 32. Then, in the semiconductor optical amplifier 32, the carrier density is decreased due to the saturation phenomenon to cause the refractive index change.

Note that it is also possible to use multi-mode interference type 3 dB optical couplers (so called MMI couplers) instead of the directional optical couplers (3 dB optical couplers) 25 to 28.

Next, the operation state of this optical XOR circuit 1 will be described.

(1) When the signal lights S1 and S2 are not entered in the state where the control light Ss is entered:

In this case, the phase difference between the control light Ss that has passed through the semiconductor optical amplifier 31 and the control light Ss that has passed through the semiconductor optical amplifier 32 is zero, and when these control lights are combined by the directional optical coupler 26 that functions as an optical combiner, the phase state is converted into the intensity change by the interference effect.

For this reason, the control light Ss with the increased optical power (in the optical signal state "1") is outputted from the port P7, while the optical power is decreased (the optical signal state becomes "0") at the port P6 so that the control light Ss is not outputted from the port P6. Consequently, the optical signal state of the output light So from the optical filter 40 becomes "0".

(2) When the signal light S1 is entered but the signal light S2 is not entered in the state where the control light Ss is entered:

In this case, the control light Ss that has passed through the semiconductor optical amplifier 31 has its phased changed by the refractive index change of the semiconductor optical amplifier 31, while the control light Ss that has passed through the semiconductor optical amplifier 32 has its phase unchanged, so that there is a phase difference between the control light Ss that has passed through the semiconductor optical amplifier 31 and the control light Ss that has passed through the semiconductor optical amplifier 32, and when these control lights are combined by the directional optical coupler 26 that functions as an optical combiner, the phase state is converted into the intensity change by the interference effect.

For this reason, the optical power is decreased (the optical signal state becomes "0") at the port P7 so that the control light Ss is not outputted from the port P7, while the control light Ss with the increased optical power (in the optical signal state "1") is outputted from the port P6. The control light Ss to be outputted from this port P6 has a waveform that is inversion of the waveform of the signal light S1 and its frequency is $\lambda s$. Consequently, the control light Ss to be outputted from the port P6 becomes the signal light that can be obtained from the signal light S1 by the wavelength conversion. In this way, the control light Ss outputted from the port P6 passes through the optical filter 40 and becomes the output light So in the optical signal state "1". Note that the signal light S1 of wavelength $\lambda 1$ and the signal light S2 of wavelength $\lambda 2$ are also outputted from the port P6, but these signal lights S1 and S2 are cut off by the optical filter 40.

(3) When the signal light S1 is not entered but the signal light S2 is entered in the state where the control light Ss is entered:

In this case, the control light Ss that has passed through the semiconductor optical amplifier 31 has its phased unchanged, while the control light Ss that has passed through the semiconductor optical amplifier 32 has its phase changed by the refractive index change of the semiconductor optical amplifier 32, so that there is a phase difference between the control light Ss that has passed through the semiconductor optical amplifier 31 and the control light Ss that has passed through the semiconductor optical amplifier 32, and when these control lights are combined by the directional optical coupler 26 that functions as an optical combiner, the phase state is converted into the intensity change by the interference effect.

For this reason, the optical power is decreased (the optical signal state becomes "0") at the port P7 so that the control light Ss is not outputted from the port P7, while the control light Ss with the increased optical power (in the optical signal state "1") is outputted from the port P6. The control light Ss to be outputted from this port P6 has a waveform that is inversion of the waveform of the signal light S2 and its frequency is $\lambda s$. Consequently, the control light Ss to be outputted from the port P6 becomes the signal light that can be obtained from the signal light S2 by the wavelength conversion. In this way, the control light Ss outputted from the port P6 passes through the optical filter 40 and becomes the output light So in the optical signal state "1". Note that the signal light S1 of wavelength $\lambda 1$ and the signal light S2 of wavelength $\lambda 2$ are also outputted from the port P6, but these signal lights S1 and S2 are cut off by the optical filter 40.

(4) When both the signal light S1 and the signal light S2 are entered in the state where the control light Ss is entered:

In this case, the control light Ss that has passed through the semiconductor optical amplifier 31 has its phased changed by the refractive index change of the semiconductor optical amplifier 31, while the control light Ss that has passed through the semiconductor optical amplifier 32 also has its phase changed by the refractive index change of the semiconductor optical amplifier 32, so that a phase difference between the control light Ss that has passed through the semiconductor optical amplifier 31 and the control light Ss that has passed through the semiconductor optical amplifier 32 is zero, and when these control lights are combined by the directional optical coupler 26 that functions as an optical combiner, the phase state is converted into the intensity change by the interference effect.

For this reason, the control light Ss with the increased optical power (in the optical signal state "1") is outputted from the port P7, while the optical power is decreased (the optical signal state becomes "0") at the port P6 so that the control light Ss is not outputted from the port P6. Consequently, the optical signal state of the output light So from the optical filter 40 becomes "0".

Figures 18, 19:
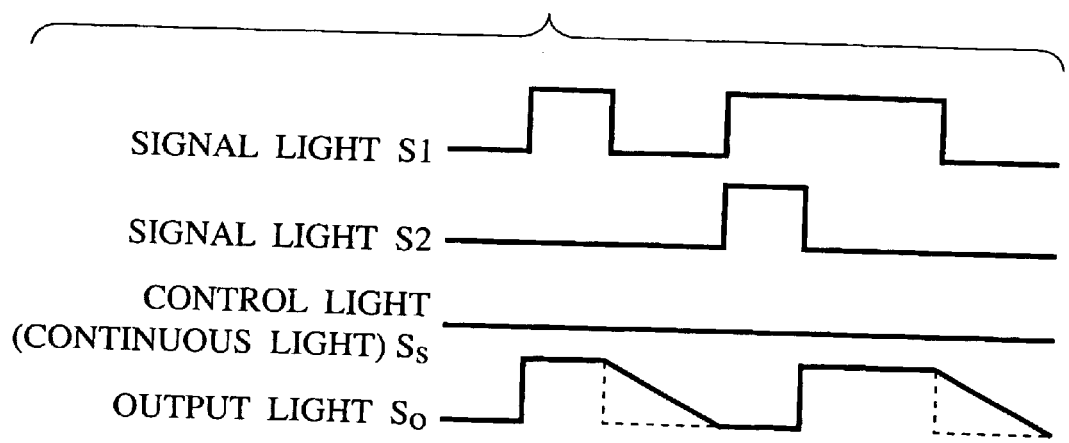
FIG. 18 is a table showing optical signal states of an output light that can be obtained in the optical XOR circuit of FIG. 17.
FIG. 19 is a diagram for explaining optical signal states that can be obtained in the optical XOR circuit of FIG. 17.

As a result, the optical signal state of the output light So becomes "1" or "0" according to the optical signal states "1" or "0" of the signal lights S1 and S2 as shown in FIG. 18. Namely, the optical signal state of the output light So at the port P6 becomes a state obtained by the XOR operation on the signal lights S1 and S2.

Consequently, as shown in FIG. 19, for example, the output light So has a waveform obtained by the XOR operation on the signal lights S1 and S2.

Figure 20:
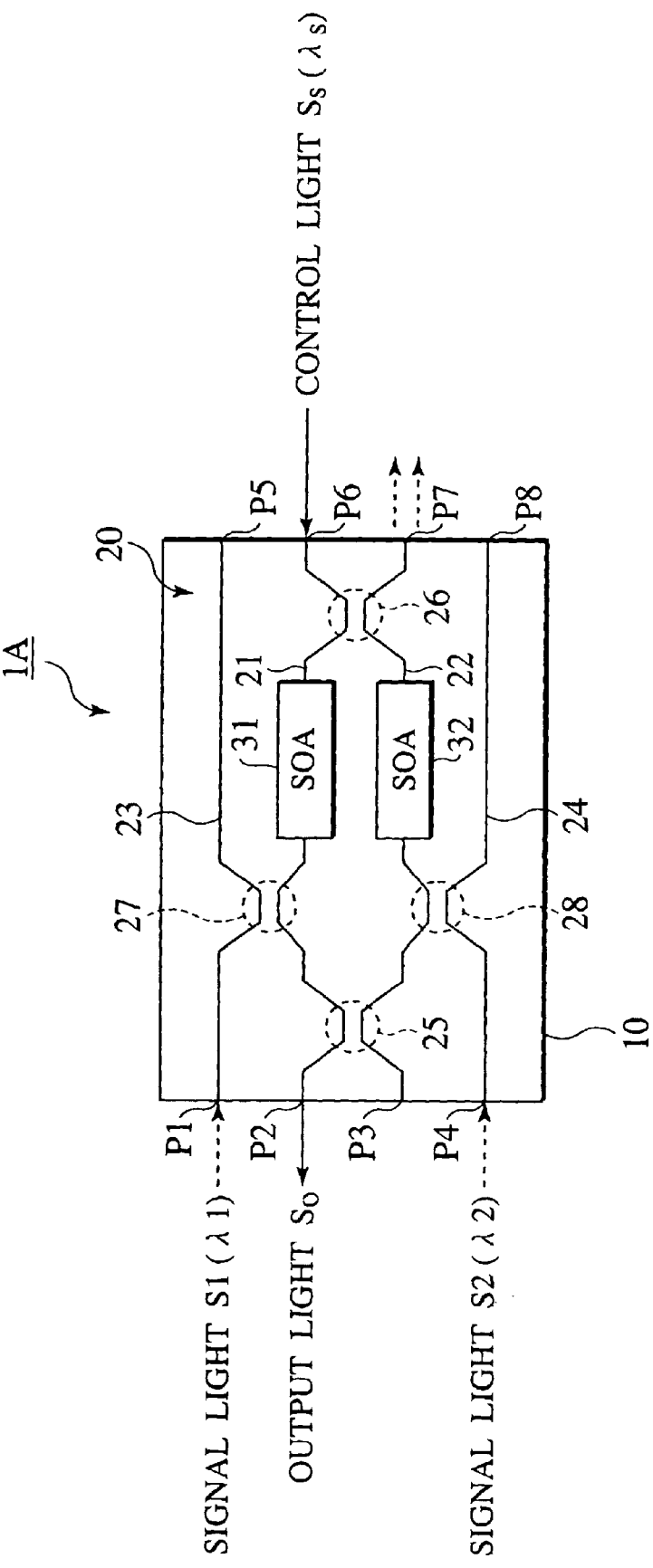
FIG. 20 is a schematic diagram showing another exemplary configuration of an optical XOR circuit that can be used in the polarization mode dispersion compensating device according to the first to seventh embodiment of the present invention.

FIG. 20 shows another optical XOR circuit 1A, in which the configuration of the wavelength converter itself is the same as that of FIG. 17, but the signal light Ss is entered in a direction opposite to the propagation direction of the signal lights S1 and S2 in order to eliminate the optical filter. Namely, the signal light S1 is entered at the port P1, the signal light S2 is entered at the port P4, and the control light Ss is entered at the port P6. For this reason, the output light So is outputted from the port P2. The optical filter is unnecessary because the signal lights S1 and S2 will not be outputted from this port P2.

Apart from the fact that the optical filter is eliminated by entering the control light Ss in a direction opposite to the propagation direction of the signal lights S1 and S2, the configuration and the operation of the other portions are similar to those of FIG. 17 so that their description will be omitted here.

Now, as shown in FIG. 19, in the optical XOR circuits 1 and 1A described above, the output light So has a quick rise (several ps, for example) and a slow fall (several hundreds of ps, for example). This is because the nonlinear effect of the semiconductor optical amplifiers 31 and 32 with optical carriers has a very short rise time but a fall time that is determined by the relaxation time of carriers after the pumping light (signal light) is turned off is long. Because the fall time of the output light So is long, there has been a limit to the realization of the faster optical XOR operation. Consequently there has been a limit to the realization of the optical XOR operation on the signal light with high frequencies.

In the following, several embodiments directed to the high speed XOR operation device capable of carrying out the optical XOR operation at high speed will be described.

Eighth Embodiment

Figure 21:
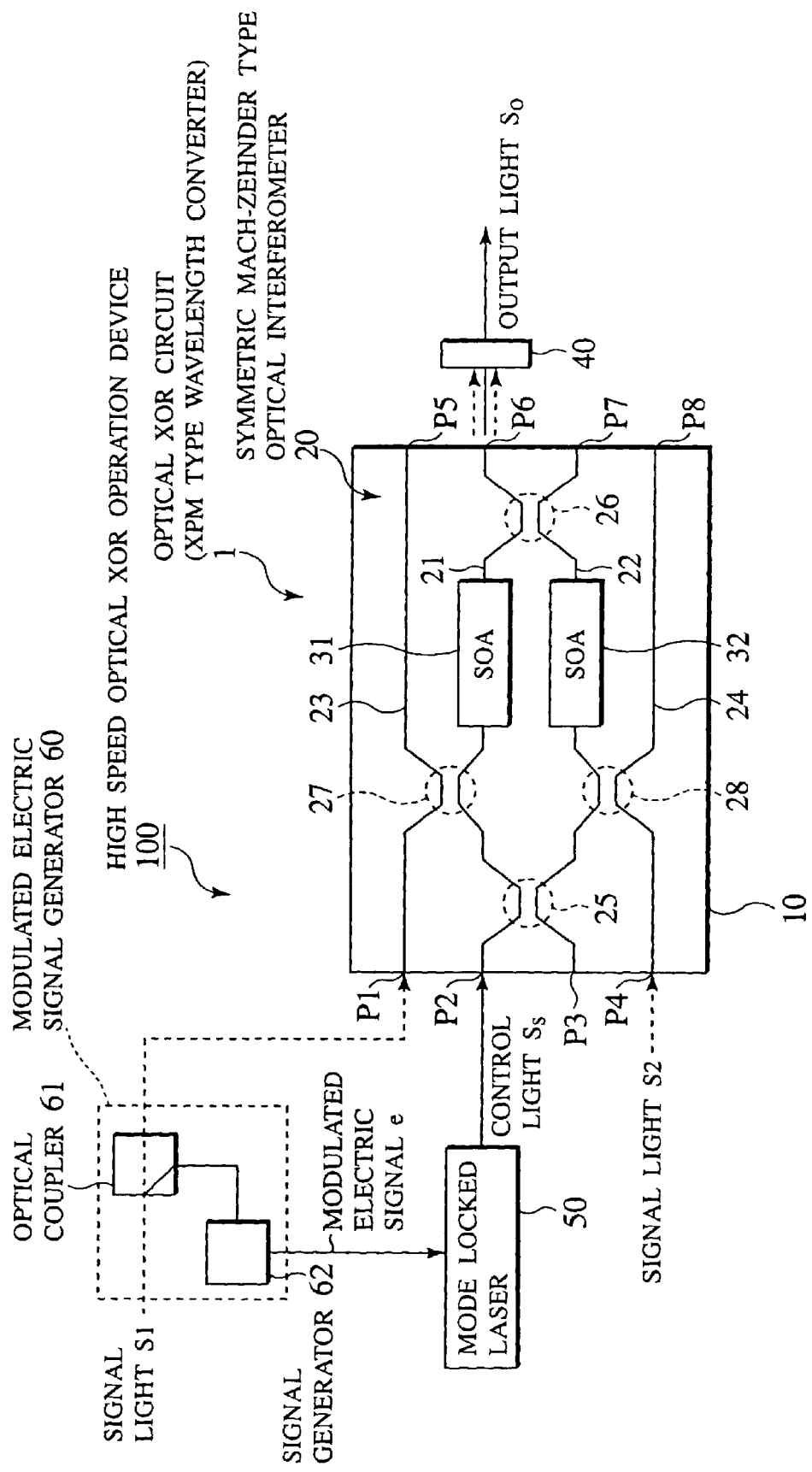
FIG. 21 is a schematic diagram showing an exemplary configuration of an optical XOR circuit according to the eighth embodiment of the present invention that can be used in the polarization mode dispersion compensating device according to the present invention.

FIG. 21 shows a high speed optical XOR operation device 100 according to the eighth embodiment of the present invention. This high speed optical XOR operation device 100 comprises an optical XOR circuit 1 formed by the cross phase modulation (XPM) type wavelength converter, a mode locked laser 50, and a modulated electric signal generator 60.

In the optical XOR circuit 1, the symmetric Mach-Zehnder type optical interferometer 20 made by optical waveguides is formed on a plane of a platform 10 formed by a planar lightwave circuit (PLC).

The symmetric Mach-Zehnder type optical interferometer 20 has two optical interference optical waveguides 21 and 22, and two signal optical waveguides 23 and 24. Then, at each of the input end side and the output end side, the optical interference optical waveguides 21 and 22 are bent toward each other to form directional optical couplers (3 dB optical couplers) 25 and 26. Also, the optical interference optical waveguide 21 and the signal optical waveguide 23 are bent toward each other to form a directional optical coupler (3 dB optical coupler) 27, and the optical interference optical waveguides 22 and the signal optical waveguide 24 are bent toward each other to form a directional optical coupler (3 dB optical coupler) 28.

On the Mach-Zehnder type optical interferometer formed by the optical interference optical waveguides 21 and 22, semiconductor optical amplifiers (SOA) 31 and 32 are implemented in a middle of the arm waveguide portions (portions located between the directional optical couplers 25 and 26 on the optical interference optical waveguides 21 and 22). By implementing the semiconductor optical amplifiers 31 and 32 on the Mach-Zehnder type optical interferometer in this way, the XPM type wavelength converter is formed.

Note that it is also possible to use multi-mode interference type 3 dB optical couplers (so called MMI couplers) instead of the directional optical couplers (3 dB optical couplers) 25 to 28.

In addition, this optical XOR circuit 1 is equipped with an optical filter 40. This optical filter 40 has a filtering characteristic for passing only lights of a wavelength component (wavelength λs) of the control light Ss. Note that, in FIG. 21, P1 to P8 are ports.

When the modulated electric signal e is entered, the mode locked laser 50 outputs the control light Ss which is a pulse laser light, with a frequency and a phase that are synchronized with a frequency and a phase of the modulated electric signal e. This control light Ss is entered into the port P2.

The modulated electric signal generator 60 is formed by an optical coupler 61 and a signal generator (which contains a photodetector) 62. The optical coupler 61 splits a part of the signal light S1 entered at the port PI, and sends the split signal light S1 to the signal generator 62. When the split signal light S1 is received, the signal generator 62 obtains an electric signal by the photoelectric conversion, and outputs the modulated electric signal e with a frequency and a phase synchronized with a frequency and a phase of the signal light S1, from this electric signal.

Consequently, the frequencies and the phases of the signal light S1, the modulated electric signal e and the control light Ss are synchronized, and the bit synchronization is established between the signal light S1 and the control light Ss.

Figure 22:
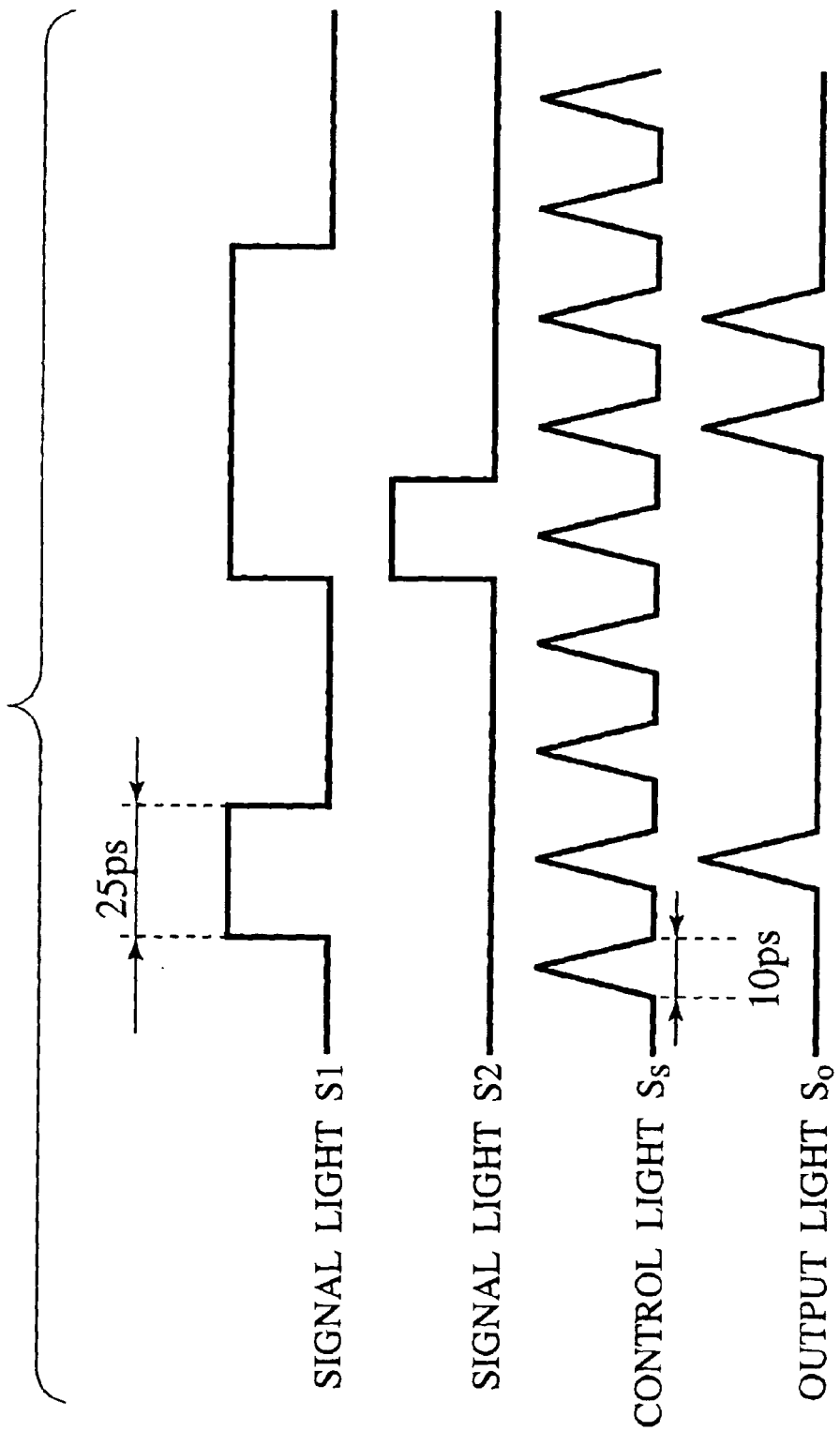
FIG. 22 is a diagram for explaining optical signal states that can be obtained in the optical XOR circuit of FIG. 21.

When the signal light S1 is entered at the port P1 and the signal light S2 is entered at the port P4 in the state where the control light Ss is entered at the port P2, the signal state of the output light So outputted from the optical filter 40 takes a state obtained by the XOR operation on the signal lights S1 and S2 as shown in FIG. 22, similarly as described above.

FIG. 22 shows a relationship among the signal light S1, the signal light S2, the control light Ss and the output light So. The pulse width of the signal lights S1 and S2 is 25 ps, for example, and the pulse width of the control light Ss is 10 ps, for example.

The control light Ss is not a continuous light but a pulse light with a narrow pulse width, so that the fall of the output light So is quick, and its pulse width is narrow (10 ps, for example). In other words, the output light So has quick rise and quick fall. The reason for the fall of the output light So to become quick is that the control light Ss is a pulse light so that the decrease of the carriers due to the saturation of the semiconductor optical amplifiers 31 and 32 is less and the carrier recovery takes shorter time.

In this way, the output light So has not only quick rise but also quick fall, so that the high speed optical XOR operation device 100 of this embodiment can carry out the XOR operation at high speed. Consequently, even when the frequencies of the inspection target signal lights S1 and S2 become high, it is possible to carry out the optical XOR operation on the high frequency signal lights S1 and S2.

Note that, in FIG. 21, it is also possible to realize the high speed XOR operation similarly, by eliminating the optical filter 40, entering the signal light S1 at the port P1, entering the signal light S2 at the port P4, entering the control light Ss at the port P6, and outputting the output light So from the port P2.

Ninth Embodiment

Figure 23:
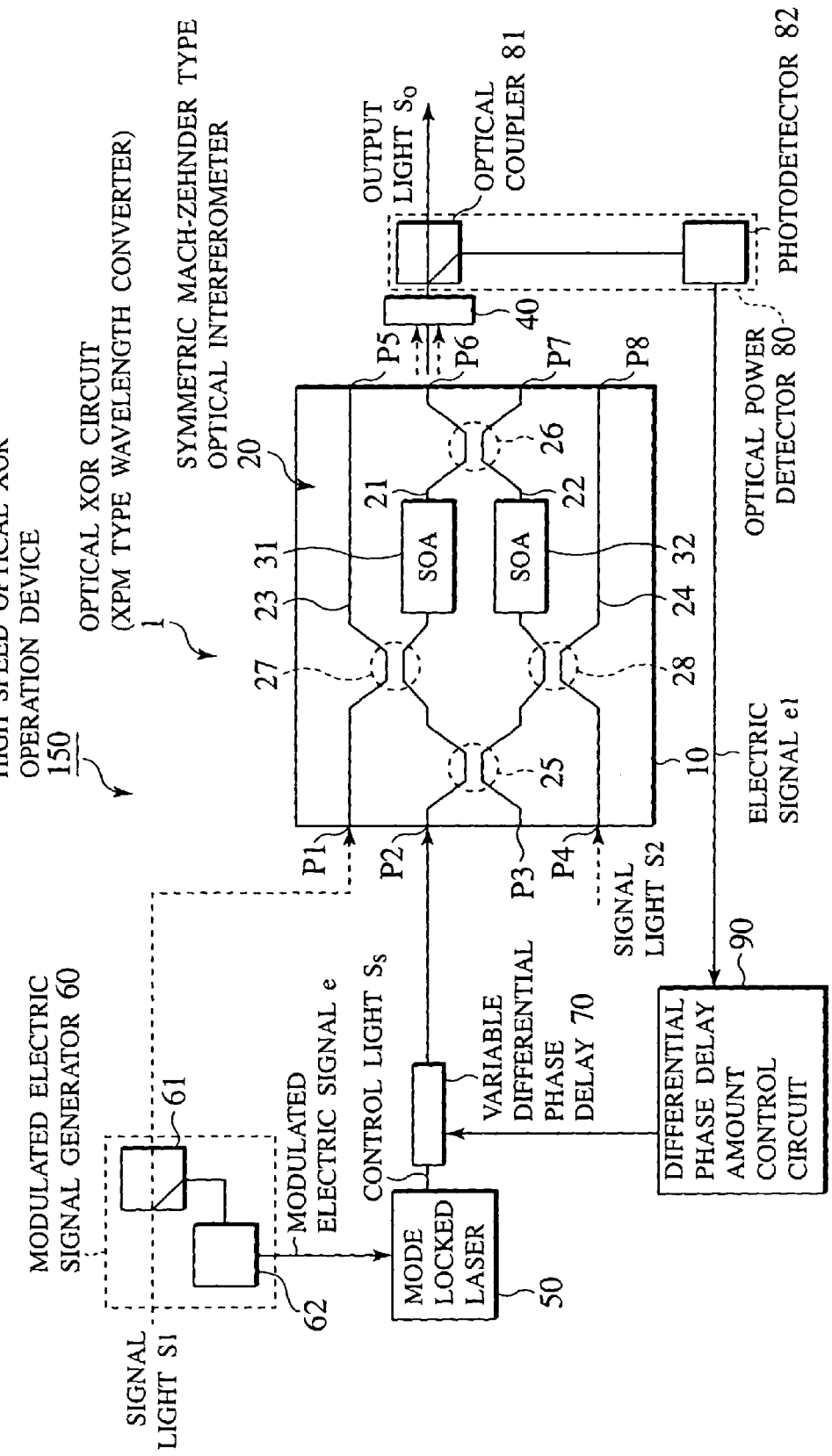
FIG. 23 is a schematic diagram showing an exemplary configuration of an optical XOR circuit according to the ninth embodiment of the present invention that can be used in the polarization mode dispersion compensating device according to the present invention.

FIG. 23 shows a high speed optical XOR operation device 150 according to the ninth embodiment of the present invention. In this high speed optical XOR operation device 150, the configuration of the high speed optical XOR operation device 100 of FIG. 21 is further provided with a variable differential phase delay unit 70, an optical power detector 80, and a differential phase delay amount control circuit 90.

The variable differential phase delay unit 70 changes the differential phase delay amount of the control light Ss outputted from the mode locked laser 50, and its detail will be described in the next embodiment.

The optical power detector 80 is formed by an optical coupler 81 for splitting a part of the output light So and a photodetector 82 for converting the split output light So into an electric signal e1.

The differential phase delay amount control circuit 90 controls the differential phase delay amount at the variable differential phase delay unit 70 such that the value of the electric signal e1 becomes maximum, i.e., the optical power of the output light So becomes maximum.

In this embodiment, even when the control light Ss outputted from the mode locked laser 50 and the signal light S1 have the coinciding frequency but slightly displaced phases, the control light Ss outputted from the variable differential phase delay unit 70 and entered into the port P2 can have the phase that is accurately coinciding with the signal light S1 by controlling the differential phase delay amount at the variable differential phase delay unit 70. In other words, it is possible to establish the accurate bit synchronization between the signal light S1 and the control light Ss entered at the port P2. As a result, it is possible to carry out the XOR operation faster and more accurately.

Note that, in FIG. 23, it is also possible to realize the fast and accurate XOR operation similarly, by eliminating the optical filter 40, entering the signal light S1 at the port P1, entering the signal light S2 at the port P4, entering the differential phase delay controlled control light Ss at the port P6, outputting the output light So from the port P2, and controlling the differential phase delay amount such that the output light So becomes maximum.

Tenth Embodiment

Figure 24:
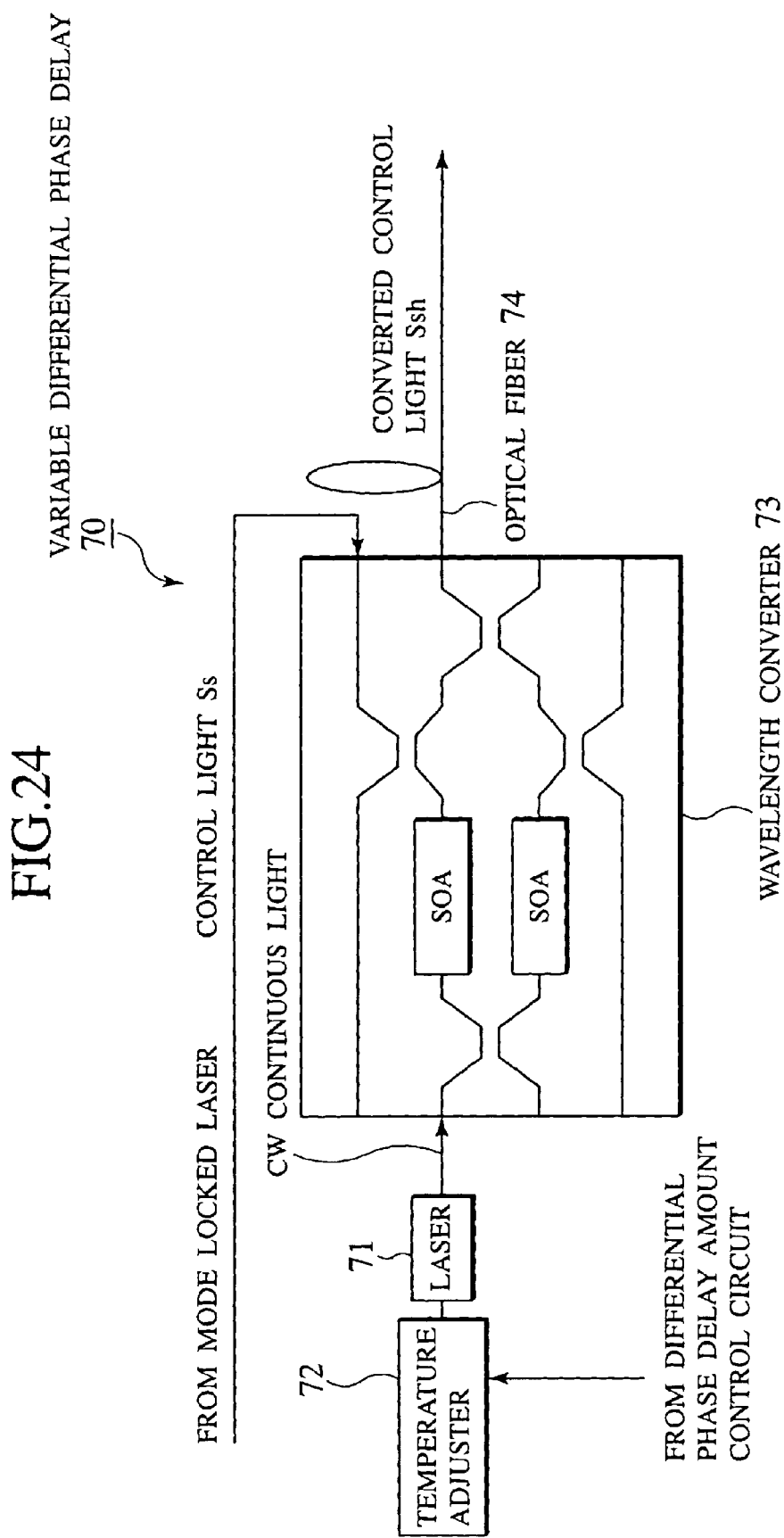
FIG. 24 is a schematic diagram showing an exemplary configuration of a variable differential phase delay unit according to the tenth embodiment of the present invention that can be used in the optical XOR circuit of the polarization mode dispersion compensating device according to the present invention.

FIG. 24 shows an exemplary configuration of the variable differential phase delay unit 70 according to the tenth embodiment of the present invention, that can be used in the high speed optical XOR operation device 150 of FIG. 23. As shown in FIG. 24, the variable differential phase delay unit 70 comprises a laser 71, a temperature adjuster 72, an XPM type wavelength converter 73, and an optical fiber 74.

The laser 71 generates the continuous light CW, and has a characteristic that the wavelength of the continuous light CW is changed by 0.1 nm when its chip temperature is changed by 1° C.

The temperature adjuster 72 changes the chip temperature of the laser 71 by ±0.5° C. from a normal temperature according to a control signal from the differential phase delay amount control circuit 90.

The wavelength converter 73 has a configuration similar to the optical XOR circuit 1 shown in FIG. 21 or FIG. 23, which has the semiconductor optical amplifiers at the arm waveguide portions of the Mach-Zehnder type optical interferometer. When the continuous light CW and the control light Ss are entered into this wavelength converter 73, the wavelength of the control light Ss is converted and the converted control light Ssh with a waveform identical to that of the control light Ss and a wavelength identical to that of the continuous light CW is outputted.

The optical fiber 74 has a wavelength dispersion characteristic such as 25 ps/0.1 nm, for example, and its length is 2 km, for example.

The converted control light Ssh outputted from the wavelength converter 73 passes through the optical fiber 74 and entered into the port P2 of the optical XOR circuit 1.

In the variable differential phase delay unit 70 in this configuration, when the chip temperature of the laser 71 is changed by 1° C. by the temperature adjuster 72, the wavelength of the continuous light CW, i.e., the wavelength of the converted control light Ssh, is changed by 0.1 nm. When the wavelength of the converted control light Ssh is changed by 0.1 nm, the differential phase delay of 50 ps is generated at the end of the optical fiber 74 (i.e., at the port P2). In other words, by changing the chip temperature of the laser 71 by ±0.5° C. from a normal temperature, it is possible to shift the differential phase delay amount of the converted control light Ssh that reaches to the port P2 by ±25 ps.

Also, the wavelength converter 73 has the same configuration as the optical XOR circuit 1, so that the wavelength converter 73 of the variable differential phase delay unit 70 and the optical XOR circuit 1 of the high speed optical XOR operation device 100 (150) can be fabricated on the same substrate simultaneously, and therefore it is possible to reduce the time and effort required for the fabrication.

As described, according to the eighth to tenth embodiments of the present invention, in the case of using the cross phase modulation type wavelength converter as the optical XOR circuit, the mode locked laser is employed to generate the control light which is a pulse light for which the bit synchronization with the signal light is established. By using the control light in a form of a pulse light in this way, the fall time of the output light that indicates the optical signal state obtained by the optical XOR operation on two signal lights becomes short, so that it becomes possible to carry out the optical XOR operation at high speed.

In addition, by adjusting the phase of the control light generated by the mode locked laser by the variable differential phase delay unit, it is possible to make the phases of the signal light and the control light accurately coinciding, so that it becomes possible to carry out the optical XOR operation at high speed accurately.

In addition, by using the variable differential phase delay unit formed by a laser in which the wavelength of the generated continuous light can be changed by controlling the chip temperature, a wavelength converter, and an optical fiber having the wavelength dispersion characteristic, it is possible to easily realize the variable differential phase delay unit that can be adjusted accurately.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A polarization mode dispersion compensating device, comprising:

a polarization mode dispersion equalizer configured to receive an input optical signal propagated through an optical fiber, and output a polarization mode dispersion compensated optical signal by compensating a polarization mode dispersion of the input optical signal such that a difference between transmission delays of a TE polarization component and a TM polarization component of the input optical signal becomes minimum;

a polarization component splitting unit configured to receive the polarization mode dispersion compensated optical signal outputted from the polarization mode dispersion equalizer, and split a part of the polarization mode dispersion compensated optical signal into the TE polarization component and the TM polarization component;

an optical XOR circuit configured to receive the TE polarization component and the TM polarization component split by the polarization component splitting unit separately at two input ports through an identical optical path length, and output a logical operation result of an optical XOR operation on the TE polarization component and the TM polarization component entered at the two input ports; and a control system configured to control compensation by the polarization mode dispersion equalizer such that the logical operation result outputted by the optical XOR circuit becomes "0".

2. The polarization mode dispersion compensating device of claim 1, wherein the polarization component splitting unit comprises:

an optical coupler configured to split a part of the polarization mode dispersion compensated optical signal while outputting a remaining part of the polarization mode dispersion compensated optical signal; and a polarization beam splitter configured to split a part of the polarization mode dispersion compensated optical signal split by the optical coupler into the TE polarization component and the TM polarization component.

3. The polarization mode dispersion compensating device of claim 1, wherein the polarization component splitting unit comprises:

a first optical coupler configured to split a part of the TE polarization component of the polarization mode dispersion compensated optical signal;

a second optical coupler configured to split a part of the TM polarization component of the polarization mode dispersion compensated optical signal.

4. The polarization mode dispersion compensating device of claim 1, wherein the polarization mode dispersion equalizer comprises:

a polarization controller configured to control a polarization state of the input optical signal; and a polarization mode dispersion controlling optical fiber configured to compensate a polarization mode dispersion of a polarization state controlled optical signal obtained by the polarization controller, by having the polarization state controlled optical signal propagated through the polarization mode dispersion controlling optical fiber;

wherein the polarization component splitting unit receives the polarization mode dispersion compensated optical signal outputted from the polarization mode dispersion controlling optical fiber, and the control system controls a control of the polarization state by the polarization controller.

5. The polarization mode dispersion compensating device of claim 4, further comprising:

an optical coupler provided between the polarization controller and the polarization mode dispersion controlling optical fiber and configured to split a part of the polarization state controlled optical signal while outputting a remaining part of the polarization state controlled optical signal to the polarization mode dispersion controlling optical fiber;

a polarization beam splitter configured to split a part of the polarization state controlled optical signal split by the optical coupler into the TE polarization component and the TM polarization component; and a second optical XOR circuit configured to receive the TE polarization component and the TM polarization component split by the polarization beam splitter separately at two input ports through an identical optical path length, and output a logical operation result of an optical XOR operation on the TE polarization component and the TM polarization component entered at the two input ports;

wherein the control system is also configured to control the control of the polarization state by the polarization controller such that the logical operation result outputted by the second optical XOR circuit does not become "0".

6. The polarization mode dispersion compensating device of claim 4, further comprising:

a first optical waveguide for polarized light configured to propagate the TE polarization component split by the polarization component splitting unit to one of the two input ports of the optical XOR circuit;

a second optical waveguide for polarized light having an identical optical path length as the first optical waveguide for polarized light and configured to propagate the TM polarization component split by the polarization component splitting unit to another one of the two input ports of the optical XOR circuit;

a first light level equalizer provided on the first optical waveguide for polarized light and configured to adjust an optical power of the TE polarization component propagated through the first optical waveguide for polarized light to be within a prescribed range; and a second light level equalizer provided on the second optical waveguide for polarized light and configured to adjust an optical power of the TM polarization component propagated through the second optical waveguide for polarized light to be within the prescribed range.

7. The polarization mode dispersion compensating device of claim 6, wherein each one of the first light level equalizer and the second light level equalizer is formed by optical amplifiers connected in one or a plurality of stages.

8. The polarization mode dispersion compensating device of claim 6, further comprising:

a first photodetector configured to detect an optical power of the TE polarization component outputted from the optical XOR circuit;

a second photodetector configured to detect an optical power of the TM polarization component outputted from the optical XOR circuit; and a control circuit configured to control amplifications of the first light level equalizer and the second light level equalizer such that optical powers of the TE polarization component and the TM polarization component detected by the first photodetector and the second photodetector become equal.

9. The polarization mode dispersion compensating device of claim 8, wherein the control circuit controls the amplifications of the first light level equalizer and the second light level equalizer, when the polarization state of the input optical signal is not in a special state in which a difference between the optical powers of the TE polarization component and the TM polarization component detected by the first photodetector and the second photodetector is less than or equal to a prescribed value.

10. The polarization mode dispersion compensating device of claim 9, wherein when the control circuit judges that the polarization state of the input optical signal is in the special state, the control circuit controls the polarization controller through the control system such that the difference between the optical powers of the TE polarization component and the TM polarization component becomes maximum.

11. The polarization mode dispersion compensating device of claim 9, wherein when the control circuit detects that the polarization state of the input optical signal is in the special state, the control circuit controls the polarization controller through the control system such that polarization planes of the TE polarization component and the TM polarization component are rotated by 90°, judges whether the polarization state of the input optical signal after rotating the polarization planes is still in the special state or not, and determines that the polarization state of the input optical signal is in the special state when the polarization state of the input optical signal after rotating the polarization planes is judged as in the special state.

12. The polarization mode dispersion compensating device of claim 11, wherein when the polarization state of the input optical signal after rotating the polarization planes is judged as not in the special state, the control circuit determines that the polarization state of the input optical signal is in an abnormal state.

13. The polarization mode dispersion compensating device of claim 9, wherein the prescribed value is given by an extinction ratio of an eye pattern of optical signals.

14. The polarization mode dispersion compensating device of claim 9, wherein the prescribed value is 13 dB.

15. The polarization mode dispersion compensating device of claim 1, wherein the polarization mode dispersion equalizer comprises:
  a polarization beam splitter configured to split the input optical signal into the TE polarization component and the TM polarization component;
  a first optical waveguide having a variable differential phase delay line provided thereon and configured to propagate one polarization component among the TE polarization component and the TM polarization component split by the polarization beam splitter;
  a second optical waveguide configured to propagate another polarization component among the TE polarization component and the TM polarization component split by the polarization beam splitter; and
  an optical combiner for combining the one polarization component propagated through the first optical waveguide and the another polarization component propagated through the second optical waveguide;
  wherein the control system controls a differential phase delay amount by the variable differential phase delay line such that the logical operation result outputted by the optical XOR circuit becomes "0".

16. The polarization mode dispersion compensating device of claim 10, wherein the polarization component splitting unit comprises:
  a first optical coupler provided on the first optical waveguide after the variable differential phase delay line and configured to split a part of the one polarization component while outputting a remaining part of the one polarization component to the optical combiner;
  a second optical coupler provided on the second optical waveguide and configured to split a part of the another polarization component while outputting a remaining part of the another polarization component to the optical combiner.

17. The polarization mode dispersion compensating device of claim 16, further comprising:
  a third optical coupler provided on the first optical waveguide before the variable differential phase delay line and configured to split a part of the one polarization component while outputting a remaining part of the one polarization component toward the optical combiner;
  a fourth optical coupler provided on the second optical waveguide and configured to split a part of the another polarization component while outputting a remaining part of the another polarization component toward the optical combiner;
  a polarization controller provided between the optical fiber and the polarization beam splitter and configured to control a polarization state of the input optical signal and output a polarization state controlled optical signal to the polarization beam splitter; and
  a second control system configured to control a control of the polarization state by the polarization controller such that a difference between optical powers of the one polarization component split by the third optical coupler and the another polarization component split by the fourth optical coupler becomes minimum.

18. The polarization mode dispersion compensating device of claim 1, wherein the polarization mode dispersion equalizer is a planar lightwave circuit type polarization mode dispersion equalizer formed by sequentially connecting a first polarization beam splitter, a first phase adjusting region, a first variable coupler, a second phase adjusting region, a second variable coupler, a polarization delaying region, and a second polarization beam splitter;
  each of the first polarization beam splitter and the second polarization beam splitter is formed by providing amorphous silicon on one waveguide and a heater on another waveguide of a symmetric Mach-Zehnder interferometer;
  each of the first phase adjusting region, the second phase adjusting region, the first variable coupler and the second variable coupler is formed by providing heaters on two waveguides of a symmetric Mach-Zehnder interferometer;
  the polarization delaying region is formed by a Mach-Zehnder interferometer with two waveguides of different lengths;
  the first phase adjusting region having a first half wave plate provided on one waveguide before a heater;
  the polarization delaying region having a second half wave plate provided on one waveguide; and
  the polarization mode dispersion equalizer being capable of changing a polarization state of the input optical signal by changing heat generation amounts of heaters provided in the polarization mode dispersion equalizer.

19. The polarization mode dispersion compensating device of claim 1, wherein the polarization mode dispersion equalizer is a $LiNbO_3$ type polarization mode dispersion equalizer in which a plurality of first comb shaped electrodes to which a first voltage is to be applied, a plurality of second comb shaped electrodes to which a second voltage is to be applied are alternately arranged on a waveguide formed by $LiNbO_3$, and earth electrodes are arranged between each adjacent comb shape electrodes;
  the first comb shaped electrodes and the second comb shaped electrodes are arranged such that intervals between adjacent comb shaped electrodes are $\Lambda/4$ and $3\Lambda/4$ alternately from an input side to an output side, where $\Lambda$ is a beat length of optical signals; and
  the polarization mode dispersion equalizer being capable of changing a polarization state of the input optical signal by changing voltages to be applied to the first comb shaped electrodes and the second comb shaped electrodes.

20. The polarization mode dispersion compensating device of claim 1, wherein the optical XOR circuit carries out has an operation speed that is slower than a transmission speed of the input optical signal, and the control system judges whether the logical operation result outputted by the optical XOR circuit is "0" or "1" by using average values of optical signals.

21. The polarization mode dispersion compensating device of claim 1, wherein the optical XOR circuit comprises:
a cross phase modulation type wavelength converter formed by two optical interference optical waveguides, two semiconductor optical amplifiers provided on the two optical interference optical waveguides, and two signal optical waveguides;
a modulated electric signal generator configured to detect a frequency and a phase of a signal light to be entered into one of the signal optical waveguides, and generate a modulated electric signal having a frequency and a phase synchronized with detected frequency and phase of the signal light; and
a mode locked laser configured to receive the modulated electric signal generated by the modulated electric signal generator and output a control light having a frequency and a phase synchronized with a frequency and a phase of the modulated electric signal, to one of the optical interference optical waveguides.

22. The polarization mode dispersion compensating device of claim 21, wherein the optical XOR circuit further comprises:
a variable differential phase delay unit configured to control a differential phase delay amount of the control light outputted from the mode locked laser while transmitting the control light to the one of the optical interference optical waveguides;
an optical power detector configured to detect an optical power of an output light in an optical signal state obtained by an optical XOR operation on two signal lights entered into the cross phase modulation type wavelength converter; and
a differential phase delay amount control circuit configured to control a control of the differential phase delay amount by the variable differential phase delay unit such that the optical power detected by the optical power detector becomes maximum.

23. The polarization mode dispersion compensating device of claim 22, wherein the variable differential phase delay unit comprises:
a continuous light generating laser in which a frequency of generated continuous light changes when a chip temperature changes;
a temperature adjuster configured to change the chip temperature of the continuous light generating laser;
a wavelength converter configured to receive the control light generated by the mode locked laser and a continuous light generated by the continuous light generating laser, and output a converted control light having an identical waveform as the control light and an identical wavelength as the continuous light, by converting a wavelength of the control light; and
an optical fiber having a wavelength dispersion and configured to transmit the converted control light outputted from the wavelength converter.

24. A polarization mode dispersion compensating method, comprising the steps of:
compensating a polarization mode dispersion of an input optical signal propagated through an optical fiber, by controlling a polarization state of the input optical signal by a polarization controller and compensating a polarization mode dispersion of a polarization state controlled optical signal by having the polarization state controlled optical signal propagated through a polarization mode dispersion controlling optical fiber, such that a difference between transmission delays of a TE polarization component and a TM polarization component of the input optical signal becomes minimum;
splitting a part of the polarization mode dispersion compensated optical signal into the TE polarization component and the TM polarization component;
adjusting optical powers of the TE polarization component and the TM polarization component to be equal, when a polarization state of the input optical signal is not in a special state in which a difference between the optical powers of the TE polarization component and the TM polarization component is less than or equal to a prescribed value;
carrying out an optical XOR operation on the TE polarization component and the TM polarization component after the adjusting step; and
controlling a control of the polarization state by the polarization controller such that a logical operation result of the optical XOR operation becomes "0".

25. The polarization mode dispersion compensating method of claim 24, wherein when the polarization state of the input optical signal is judged as in the special state, the controlling step controls the polarization controller such that the difference between the optical powers of the TE polarization component and the TM polarization component becomes maximum.

26. The polarization mode dispersion compensating method of claim 24, wherein when the polarization state of the input optical signal is detected as in the special state, the controlling step controls the polarization controller such that polarization planes of the TE polarization component and the TM polarization component are rotated by 90°, judges whether the polarization state of the input optical signal after rotating the polarization planes is still in the special state or not, and determines that the polarization state of the input optical signal is in the special state when the polarization state of the input optical signal after rotating the polarization planes is judged as in the special state.

* * * * *